United States Patent [19]

Minayoshi et al.

[11] Patent Number: 5,275,651
[45] Date of Patent: Jan. 4, 1994

[54] MONODISPERSE VATERITE TYPE CALCIUM CARBONATE, ITS MANUFACTURING METHOD AND METHOD OF CONTROLLING GROWTH OF PARTICLES AND SHAPE THEREOF

[75] Inventors: Shiro Minayoshi; Naofumi Saito, both of Akashi; Minoru Hanazaki, Kakogawa; Hidehiko Nishioka, Akashi; Sakae Kuroda, Kakogawa; Masako Takahashi, Akashi; Seiya Shimizu, Himeji; Norimasa Maida, Kudamatsu, all of Japan

[73] Assignee: Maruo Calcium Company Limited, Akashi, Japan

[21] Appl. No.: 706,423

[22] Filed: May 28, 1991

[30] Foreign Application Priority Data

May 28, 1990 [JP] Japan ................... 2-137482
May 28, 1990 [JP] Japan ................... 2-137483
Mar. 20, 1991 [JP] Japan ................... 3-81532

[51] Int. Cl.$^5$ ............................ C01F 11/18
[52] U.S. Cl. ....................... 106/464; 423/432
[58] Field of Search ........ 106/463, 464; 423/430, 423/431, 432, 419

[56] References Cited

U.S. PATENT DOCUMENTS

| | | | |
|---|---|---|---|
| 3,321,269 | 5/1967 | Yasui et al. | 423/431 |
| 4,732,748 | 3/1988 | Stewart et al. | 423/430 |
| 4,767,464 | 8/1988 | Strauch et al. | 106/464 |
| 4,793,985 | 12/1988 | Price et al. | 423/430 |
| 4,835,195 | 5/1989 | Rayfield et al. | 106/464 |

FOREIGN PATENT DOCUMENTS

| | | | |
|---|---|---|---|
| 1-119512 | 5/1989 | Japan | 423/430 |
| 2-243514 | 9/1990 | Japan | 423/432 |
| 644430 | 10/1950 | United Kingdom | 423/430 |

*Primary Examiner*—Gregory A. Heller
*Assistant Examiner*—Stephen G. Kalinchaic
*Attorney, Agent, or Firm*—Armstrong, Westerman, Hattori, McLeland & Naughton

[57] ABSTRACT

A monodisperse spherical, ellipsoidal or plate-like vaterite calcium carbonate almost free from secondary aggregation is disclosed. The vaterite type calcium carbonate is prepared by the steps of adding 5-20 times mol equivalent of water with respect to unslaked lime to a methanol suspension of 0.5-12 weight % of unslaked lime and/or slaked lime (in case of slaked, conversion is to be made into unslaked lime of the same mol) to prepare of a mixture of methanol, unslaked lime and/or slaked lime and water, letting carbon dioxide gas through said mixture, adjusting the temperature in the carbonation reaction system to not less than 30° C. before arrival of conductivity within carbonation reaction system at the maximal point on conductivity variation curve in the carbonation reaction system and adjusting the time from start of carbonation reaction to the point where the conductivity is 100μ S/cm to be less than 1,000 minutes. A method for growing or controlling in shape the vaterite calcium carbonate used as matrix is also disclosed.

5 Claims, 11 Drawing Sheets

MONODISPERSE VATERITE TYPE CALCIUM CARBONATE, ITS MANUFACTURING METHOD AND METHOD OF CONTROLLING GROWTH OF PARTICLES AND SHAPE THEREOF

BACKGROUND OF THE INVENTION

1. Field of the Invention

The present invention relates to a spherical, ellipsoidal or plate-like vaterite type calcium carbonate almost free from secondary aggregation and well dispersible, its manufacturing method and a method of controlling the growth of particles and shape of vaterite-type calcium carbonate in which calcium carbonate is used as matrix and the particle size and shape of the matrix are varied so as to prepare vaterite type calcium carbonate different from the matrix and improved in dispersibility compared with the matrix vaterite type calcium carbonate different therefrom in particle size and shape.

2. Description of the Prior Art

As industrial manufacturing method of synthesized calcium carbonate, the carbon dioxide method is widely adopted. This carbon dioxide method comprises steps of first obtaining unslaked lime (calcium oxide) by calcinating limestone occurring in nature, letting this unslaked lime react with water to form milk of lime (aqueous suspension of calcium hydroxide) and then letting carbon dioxide gas resulting from calcination of limestone pass through and react with this milk of lime to thereby obtain calcium carbonate.

The synthetic calcium carbonate manufactured by this carbon dioxide gas method is used in large quantities as filler or pigment for rubber, plastics, paper, paints et cetera according to the size of the primary particles.

The synthetic calcium carbonate for these uses is surface-treated with various inorganic or organic treating agents according to the intended use for further improvement of its physical properties when mixed in such products.

The synthetic calcium carbonate manufactured by this carbon dioxide gas method, however, is essentially extremely high in inter-primary particle cohesive power and large numbers of primary particles aggregate to a large secondary particle (coarse aggregate of primary particles) and the slurry of these secondary particles is impossible to disperse as primary particles even by prolonged powerful stirring.

When synthetic calcium carbonate containing a large number of aggregates of primary particles is used a as filler or pigment for rubber, plastics, paper, paints or the like, the secondary particles shows a behavior as if they were primary particles, hence no good physical properties are obtained, the consequence being poor dispersibility, lowered physical strength, lowered luster and aggravated fluidity, the mixing effect essentially as with primary particles being thus unattainable.

Even if such surface treatment by the use of inorganic or organic treating agents should be applied to synthetic calcium carbonate containing a large number of aggregates, it means only treatment of the surface of secondary particles and no sufficient treatment can be hoped for.

Although many methods have been reported to date for dispersion of such aggregates of primary particles, generally adopted is the method of powerfully grinding and breaking them using a ball mill, sand grinder mill or the like. Since, however, this method is a milling mode of grinding, dispersion of aggregates thereby is accompanied by breaking of primary particles, this resulting in coexisting of particles extremely unstable in surface conditions and smaller in size than the desired primary particles and aggregated secondary particles dispersed insufficiently and can hardly be preferable, for the particle size distribution is quite broad.

A wet grinder such as sand grinder mill usually uses extremely small glass beads as grinding media. Since, however, the surface of such glass beads is ground and broken in the process of grinding and breaking calcium carbonate, the calcium carbonate having undergone dispersion has mixed therein a large number of coarse pieces of glass of 20 $\mu$m or so, and it is not advisable to use such wet-grinding method for dispersion of calcium carbonate for use as filler for films as thin as 15 $\mu$m or so.

Calcium carbonate has as polymorphisms, calcite type crystals of hexagonal system, aragonite crystal of rhombic system and vaterite type crystals of pseudohexagonal system. Of all these, however, now being industrially manufactured and being applied to various uses are, for the most part, cubic or spindle shaped calcite type crystals and needle or columnar aragonite crystals.

In contrast thereto, vaterite type calcium carbonate is rather better in dispersibility than the other two crystal forms and also because of freedom from large coarse aggregates it is expected to be effective for improvement of coating property as well as of filling performance and also for improvement of the product's physical strength, luster, whiteness and/or printing property.

From the above viewpoint, various methods have been studied for industrial manufacture of vaterite type calcium carbonate.

For example, in Japanese Laid-open Patent Publication No. 90822/'85 there is disclosed a method in which vaterite type calcium carbonate is obtained by introducing carbon dioxide gas into aqueous suspension of calcium hydroxide including magnesium compounds and then adding alkali polyphosphate or alkaline metal salt thereof when a certain carbonation ratio has been reached, and in Japanese Laid-open Patent Publication No. 150397/'79 disclosed is a method of adding ammonia to the calcium chloride/calcium hydrogen carbonate reaction system so that the slurry's pH value reaches 6.8 upon completion of the reaction.

Both of these methods, however, are not only more complicated than the conventional manufacturing method for cubic or spindle shaped calcium carbonate but their use also makes it difficult to control the size of vaterite type calcium carbonate particles so that the primary particles of the obtained vaterite type calcium carbonate are non-uniform in particle size, and are also lacking in dispersibility.

Lately, there have been proposed various methods for manufacturing vaterite type calcium carbonate in which the same is manufactured by carbonating calcium hydroxide contained in some organic solvent.

For example, in Comparative Example 1 of Japanese Laid-open Patent Publication No. 64527/'84 there is disclosed a method of manufacturing calcium carbonate of vaterite type by blowing carbon dioxide gas into a mixed solution of a calcium hydroxide aqueous slurry and methanol, and in Japanese Laid-open Patent Publication No. 77622/'86 described is a method of manufacturing noncrystalline or crystal calcium carbonate of vaterite type or the like by blowing carbon dioxide gas into a suspension liquid system of calcium hydroxide-water-alcohol.

Although it is possible to obtain vaterite type calcium carbonate at a high yield, arbitrary control of the particle size and shape thereof is infeasible, a further defect being that stable manufacture of monodisperse spherical, ellipsoidal or plate-like vaterite type calcium carbonate is also infeasible.

Lately, especially for uses in highly advanced technical fields there are required, for development of industrial products of still higher functionality, monodisperse inorganic particles of controlled size and shape a high degree of dispersibility.

For example, with polyester film used for the manufacture of magnetic tape such as audio tape, video tape et cetera, its slipperiness and anti-shaving property are important factors on which depend the workability in the film manufacturing process as well as in the process for manufacturing various secondary products and also the quality of the individual products attainable. If the slipperiness and anti-shaving properties are insufficient or unsatisfactory, when, for example, a magnetic layer is formed by coating on the surface of polyester film and the film so coated is used as magnetic tape, the friction between the coating roll and the film surface as the magnetic layer is formed by coating is quite marked as well as the wear in film surface and in extreme cases it results in formation of creases, abrasions and the like. Even after slitting the film with a coated layer of magnetic material and finishing as audio tape, video tape or tape for computer, marked wear results between such tapes and guides, playback heads and the like as the tape is pulled out of a reel, cassette or the like or as it is wound up, this causing generation of abrasion, strain and the like and separation of chalk-like substance due to shaving of polyester film surface. And it often results in the so-called drop-out of magnetic recording signal.

For lowering a polyester film's friction coefficient there have, hitherto, been proposed many methods in which fine particles are incorporated in the polyester to impart a minute and proper degree of roughness to the surface of a molded article for properly controlling or improving the surface slipperiness thereof. So far, however, there was much to be desired about the compatibility between such fine particles and the polyester, nor and the film's transparency and its wear resistance are not satisfactory. To further explain this method, there have hitherto been proposed many methods for improving the surface properties of polyester as follows:

(1) a method in which a part or whole of the catalysts and the like used in synthesis of the polyester are caused to separate in the reaction process (internal particles separation system).

(2) a method in which fine particles such as calcium carbonate and silicium dioxide are added during or after polymerization (external particles adding system).

With such particles for imparting a proper degree of roughness to the surface of polyester film it is generally accepted that the larger their size, the higher the effect of improving slipperiness. With magnetic tapes, especially such high precision tapes as video tape, large particle size itself may possibly cause defects such as drop-out and for this reason the degree of roughness in the film surface is required to be as low as possible, although these requirements are apparently contradictory.

The (1) internal particles separation system is a method in which the particles are metallic salts of polyester component or the like, hence their compatibility with polyester is somewhat satisfactory but, since, at the same time, it is a method in which the particles are caused to form in the course of reaction, it is difficult to control the quantity as well as size of particles and prevent formation of coarse particles.

The (2) system is a method in which the quantity and size of particles to be added are properly selected and the slipperiness attainable is further improved through addition of fine particles with coarse particles eliminated by classification or the like.

Since the compatibility between inorganic fine particles and polyester as organic component is insufficient, exfoliation takes place in the boundary between inorganic particles and polyester, this resulting in formation of voids. If such voids should exist in polyester, inorganic particles are apt to release from polyester film due to damage to polyester film through contact between polyester films as well as between polyester film and other substrate, this possibly resulting in chalking of film for magnetic tape and the phenomenon called dropout.

Although for manufacture of polyester film the methods (1) and (2) are currently being used as alternatives but the method (2) has been gradually adding importance because of its greater ease of selection of particle size as well as of reproducibility of quality. Since the inorganic particles used in the method (2) has insufficient compatibility with polyester, however, chalking due to release of particles from polyester film caused by damage to polyester film is likely to occur. In order to preclude this phenomenon, chemical approach is being made by development of and research about effective surface treating agents for inorganic fine particles, while physical approach is being made by development of and research about inorganic fine particles in such shapes difficult to be released from polyester film. As to the shape of inorganic fine particles used in the method (2), ellipsoidal or plate-like particles are taken to be better than spherical particles from viewpoint of difficulty to release from polyester film but spherical particles are said to be ideal from viewpoint of film's slipperiness, which is another important physical property.

As plate-like inorganic particles for use in the method (2), kaolin clay prepared by elimination of coarse particles by the use of a special classification technique is mainly used. Since the kaolin used in this field is one refined from natural kaolin, the primary particles are extremely non-uniform in particle size as well as shape. Since it is taken that complete elimination of coarse particles is not feasible even by repeated classification using advanced classification technique and for this reason kaolin has no possibility as anti-blocking agent of high-grade polyester film, development of plate-like particles uniform in particle size, substantially not containing aggregate particles and well dispersible has long been waited for.

As to the plate-like particles of calcium carbonate, research has hitherto been made from various angles. For example, there have been proposed a method of first synthesizing calcium hydroxide and then carbonating it under heating to obtain calcium carbonate with the particle shape of calcium hydroxide, and a method of adding calcium hydrogen carbonate to water under controlled heating. The platelike calcium carbonate obtained by those methods is extremely broad in particle size distribution and there is something to be desired about its dispersibility and the latter manufacturing method has a defect of being difficult to control the particle size of plate-like calcium carbonate in its commercial manufacture.

Further, research and development of plate-like basic calcium carbonate represented by the composition formula $CaCO_3 \cdot xCa(OH)_2 \cdot yH_2O$ as similar to plate-like calcium carbonate are being made in various fields and typical of such manufacturing method are described in Japanese Laid-open Patent Publication No. 219715/'86, Japanese Laid-open Patent Publication No. 113718/'87 et cetera.

Although basic calcium carbonate of this kind has $CaCO_3$ in its composition formula, it is a substance entirely different from calcium carbonate. It can generally exist stably only in a highly alkaline range and, with its pH being much higher than that of ordinary calcium carbonate, it is usable only in a narrow field, which is a great defect.

As spherical inorganic particles for use in the conventional method (2), a monodisperse spherical silica obtainable by hydrolysis of alkoxysilane and, condensation reaction et cetera has been developed and, since it is uniform in particle size, good in dispersibility in ethylene glycol as well as polyester, its possibility as anti-blocking agent for video tape with its especially high requirement about quality is being studied. This spherical silica is difficult to provide economically due to the very high cost of alkoxysilane as its material, and requires a very long time for reaction due to slow progress of hydrolytic reaction. It is apt to have its spherical particles released from polyester film due to damage to polyester film, for its compatibility with polyester is insufficient compared with other inorganic particles externally added to polyester, this likely resulting in the risk of chalking and drop-out when it is used for manufacture of film for magnetic tapes. The spherical silica has another fatal defect of being high, not less than 6, in Mohs hardness and the spherical silica released from polyester film has a risk of damaging the surface of playback head of video tape recorder.

Hence, with the inorganic particles for use in the manufacture of such polyester films required is establishment of morphological control techniques for delicate control of particle size and shape such as particle's shape controlling technique, for example, modifying ellipsoidal particles to be closer to real sphere, ellipsoidal particles to spherical particles, spherical particles to plate-like particles, or plate-like particles to those increased in thickness, and particle size control technique for increasing particle size with the solid geometrical similarity in shape maintained, to say nothing of requirement about uniformity of particles and about high dispersibility. Another essential requirement is that Mohs hardness of such inorganic particles be relatively low, being 3 or so.

Since Mohs hardness of calcium carbonate is approximately 3, being thus relatively low among known inorganic particles, development of calcium carbonate which is at least equivalent to the aforementioned spherical silica as externally added inorganic particles in uniformity of particles and dispersibility and with which delicate morphological control of particle's shape and size et cetera has long been awaited.

As to calcite type calcium carbonate and aragonite type calcium carbonate as polymorphisms of vaterite type calcium carbonate, various methods have been reported to date about techniques of controlling particle size with the shape of cubic or needle-shaped particles maintained, if the poor uniformity of shape of particles and poor dispersibility are disregarded. As to vaterite type calcium carbonate, especially that good in dispersibility and uniformity of particles, no report has been made to date even about particle size control techniques, to say nothing of particle's shape control techniques.

SUMMARY OF THE INVENTION

An object of the present invention is to provide spherical, ellipsoidal and plate-like vaterite type calcium carbonate almost free from secondary aggregation and excellent in dispersibility and a manufacturing method thereof.

Another object of the invention is to provide methods for growing particles and shape control, with the aforementioned spherical, ellipsoidal and plate-like vaterite type calcium carbonate as matrix, of vaterite type calcium carbonate good in dispersibility different from the matrix in particle size and shape.

Further objects and advantages of the invention will become apparent from reading of the detailed description of the invention given below.

The present inventors, after having studied intensively about vaterite type calcium carbonate well usable also in fields where requirement is made of high dispersibility, uniformity of particles and selectivity of any given form of particle, could find out that calcium carbonate in any desired form is obtainable easily and stably by letting carbon dioxide gas through a methanol suspension containing given quantities of unslaked lime and/or slaked lime and water, adjusting the temperature in the reaction system to a predetermined level at a given point in the progress of carbonation reaction and further carrying out the reaction with the time elapsed from the start of the carbonation reaction to the point where the conductivity reaches the predetermined value, and the calcium carbonate so obtained has a characteristic uniformity of primary particles as well as dispersibility.

Further, by carrying out carbonation reaction with pH and temperature in the reaction system controlled at predetermined levels, with the vaterite type calcium carbonate having the aforementioned uniformity of primary particles as well as dispersibility as matrix, vaterite type calcium carbonate of any desired particle size and shape is obtainable from matrix vaterite type calcium carbonate.

The present invention has been completed on the basis of such newly acquired knowledge.

DETAILED DESCRIPTION OF THE INVENTION

Figure 1:
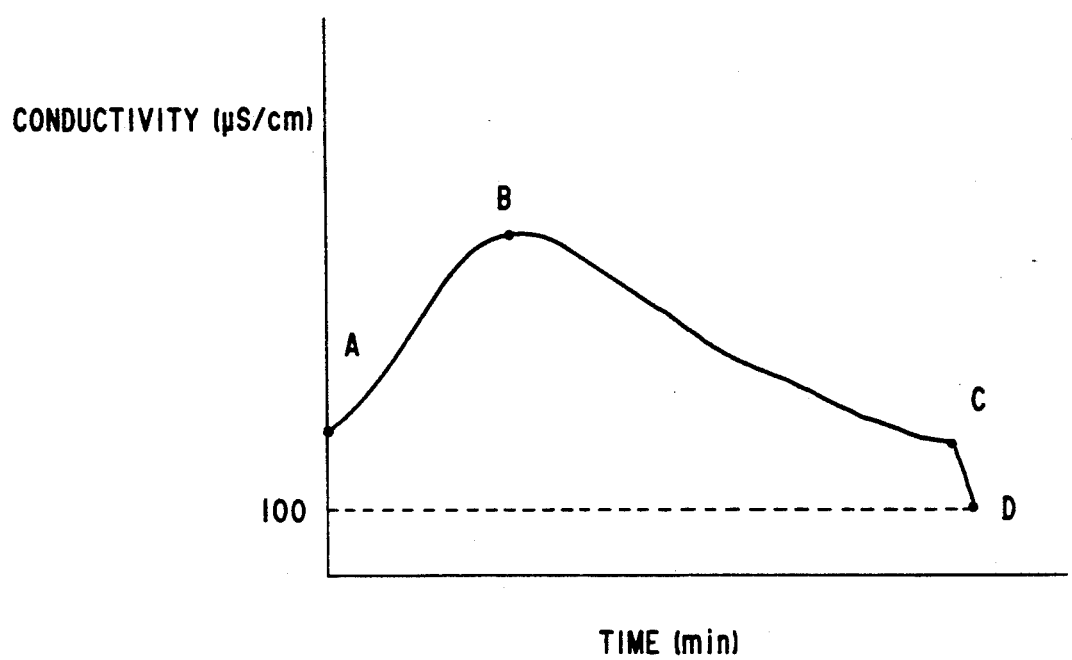
FIG. 1 shows a conductivity variation curve in carbonation reaction system.

The present invention relates firstly to spherical, ellipsoidal or plate-like calcium carbonate satisfying the requirements of (a), (b), (c), (d), (e), (f) and (g) below.

(a) $0.1\mu m \leq DS1 \leq 2.0\mu m$
(b) $0.04\mu m \leq DS2 \leq 2.0\mu m$
(c) $1.0 \leq DS1/DS2 \leq 20$
(d) $DP3/DS1 \leq 1.25$
(e) $1.0 \leq DP2/DP4 \leq 2.5$
(f) $1.0 \leq DP1/DP5 \leq 4.0$
(g) $(DP2-DP4)/DP3 \leq 1.0$ where DS1: Mean particle size ( $\mu m$, major axis) of primary particles as determined by the aid of scanning electron microscope (SEM).

DS2: Mean particle size ( $\mu m$, width) of primary particle size as determined by the aid of scanning electron microscope (SEM).

DP1: Mean particle size ( $\mu m$ ) for a total of 10% by weight counted from the larger particle size side on the basis of the particle size distribution determined by the aid of light transmission type particle size distribution tester (Shimadzu Corp.'s SA-CP3).

DP2: Mean particle size ( $\mu m$ ) for a total of 25% by weight counted from the larger particle size side on the basis of the particle size distribution determined by the aid of the light transmission type particle size distribution tester (Shimadzu Corp.'s SA-CP3).

DP3: Mean particle size ( $\mu m$ ) for a total of 50% by weight counted from the larger particle size side on the basis of the particle size distribution determined by the aid of the light transmission type particle size distribution tester (Shimadzu Corp.'s SA-CP3).

DP4: Mean particle size ( $\mu m$ ) for a total of 75% by weight counted from the larger particle size side on the basis of the particle size distribution determined by the aid of the light transmission type particle size distribution tester (Shimadzu Corp.'s SA-CP3).

DP5: Mean particle size ( $\mu m$ ) for a total of 90% by weight counted from the larger particle size side on the basis of the particle size distribution determined by the aid of the light transmission type particle size distribution tester (Shimadzu Corp.'s SA-CP3).

In the present invention, measurement of the particle size by the aid of the light transmission type particle size distribution tester was done in the following way.

Measuring instrument: Shimadzu Corp.'s SA-CP3

Measuring method

Solvent: Aqueous solution prepared by dissolving 0.004 weight % of sodium polyacrylate in ion exchange water.

Preliminary dispersion: Ultrasonic dispersion 100 sec.

Measuring temperature: 27.5° C.±2.5° C.

Measuring method: See the calculation example below.

Result measured of particle size distribution

| Particle size (μm) | Total weight (%) |
| --- | --- |
| 8.00~6.00 | 0.0 |
| 8.00~5.00 | 1.0 |
| 8.00~4.00 | 3.0 |
| 8.00~3.00 | 6.0 |
| 8.00~2.00 | 11.0 |
| 8.00~1.00 | 18.0 |
| 8.00~0.80 | 28.0 |
| 8.00~0.60 | 42.0 |
| 8.00~0.50 | 58.0 |
| 8.00~0.40 | 72.0 |
| 8.00~0.30 | 82.0 |
| 8.00~0.20 | 89.0 |
| 8.00~0.15 | 94.0 |
| 8.00~0.10 | 97.0 |
| 8.00~0.08 | 99.0 |
| 8.00~0.06 | 100.0 |
| 8.00~0.00 | 100.0 |

The values DP1, 2, 3, 4 and 5 calculated on the basis of the above result of the measurement of particle size distribution are as follows:

$DP1 = 2.00 + (11.0-10.0) \times (3.00-2.00) \div (11.0-6.0) = 2.20$ $DP2 = 0.80 + (28.0-25.0) \times (1.00-0.80) \div (28.0-18.0) = 0.86$ $DP3 = 0.50 + (58.0-50.0) \times (0.60-0.50) \div (58.0-42.0) = 0.55$ $DP4 = 0.30 + (82.0-75.0) \times (0.40-0.30) \div (82.0-72.0) = 0.37$ $DP5 = 0.15 + (94.0-90.0) \times (0.20-0.15) \div (94.0-89.0) = 0.19$ In the present invention, measurement of DS values was done by the aid of Hitachi, Ltd.'s scanning electron microscope at a magnification of 1:20,000.

Secondly, the present invention relates to a manufacturing method of monodispersed vaterite type calcium carbonate spherical, ellipsoidal or plate-like in particle shape and having the aforementioned dispersibility, which comprising steps of adding water in a quantity equivalent to 5-20 times mol with respect to unslaked lime (in case of slaked lime, conversion to be made into unslaked lime of equal mol) to methanol suspension of unslaked or slaked lime 0.5-12 weight % in terms of unslaked lime concentration for preparation of a mixed system of methanol, unslaked lime and/or slaked lime and water, letting carbon dioxide gas through the mixed system, then adjusting the temperature in the system to not less than 30° C. before the conductivity in the carbonation reaction system reaches the maximal point and finally adjusting the time elapsed from the start of carbonation reaction to where the conductivity in the carbonation reaction system reaches the point of $100\mu$ S/cm is less than 1,000 minutes, to thus effect the carbonation reaction.

Thirdly, the present invention relates to a method for growth of particles as well as for morphological control of vaterite type calcium carbonate, which comprises steps of letting carbon dioxide gas through a mixed system of vaterite type calcium carbonate as matrix, methanol, water, unslaked lime and/or slaked lime and conducting carbonation reaction with the pH in the carbonation reaction system controlled in a range of 5.6-11.5 and the reaction temperature controlled in a range of 15°-60° C., the method meeting the following requirements:

(a) The quantity of water existing in the carbonation reaction system should be equal to 3-30 times mol with respect to the calcium carbonate and unslaked lime and/or slaked lime with its quantity converted into that of unslaked lime which are present in the carbonation reaction system.

(b) The solid concentration of the calcium carbonate and unslaked lime and/or slaked lime whose solid concentration is to be converted into that of unslaked lime, should be 0.5-12 weight % with respect to methanol present in the carbonation reaction system.

(c) The vaterite type calcium carbonate to be used as matrix should be the vaterite type calcium carbonate (vaterite type calcium carbonate having the aforementioned dispersibility) described in the first invention.

The first invention will now be described in greater detail.

The first invention relates to morphology and dispersibility of vaterite type calcium carbonate. The first object of the present invention is to provide vaterite type calcium carbonate applicable to highly advanced technical uses where high dispersibility and high uniformity of particles are indispensable, for example, as antiblocking agent as an additive for films not more than 5 $\mu$m thick, polyester film used for manufacture of 8 mm video tape for 8 mm video camera or polyester film used for manufacture of capacitors.

The aforementioned object can not be accomplished with vaterite type calcium carbonate not having the morphological features and dispersibility according to the first invention.

As described below in detail, the vaterite type calcium carbonate according to the third invention is obtainable by growth of particles and morphological control of particles with the vaterite type calcium carbonate according to the first invention as matrix. Hence, in order to prepare vaterite type calcium carbonate by the third invention it is essential to use as matrix the vaterite type calcium carbonate having morphological features and dispersibility according to the first invention.

The vaterite type calcium carbonate having features set forth in the first invention can be manufactured by a method according to the second invention.

The second invention will now be described in greater detail.

First, unslaked lime powder and/or slaked lime powder are put into methanol to prepare methanol suspension of unslaked lime and/or slaked lime. The required concentration of unslaked lime and/or slaked lime is in a range of 0.5-12 weight %, (in case of the latter in terms of concentration converted into that of unslaked lime, hereinafter called unslaked lime concentration), with respect to methanol and preferably in a range of 1-8 weight %.

If the unslaked lime concentration is less than 0.5 weight %, it is not only uneconomical due to increase of the quantity of methanol required but also makes it difficult to control the reaction conditions in the later steps of the carbonation reaction process, this resulting in an extremely low yield of the vaterite type calcium carbonate according to the first invention.

If the unslaked lime concentration is in excess of 12 weight %, gelation is likely to occur within the reaction system in the later steps of the carbonation reaction process. Worse, it results in increased non-uniformity in shape and size of calcium carbonate obtained and failure in obtaining calcium carbonate improved in the degree of dispersion of particles.

Next, 5-20 times mol equivalent, preferably 5-15 times mol equivalent of water with respect to unslaked lime is added to the methanol suspension of unslaked lime and/or slaked lime to prepare a mixed system of methanol, unslaked lime and/or slaked lime and water.

If the quantity of water added is less than 5 times mol, gelation is likely to occur in the later steps of the carbonation reaction process, while, if it is more than 20 times mol, the resulting calcium carbonate is mixed with various crystalline calcium carbonate of such as calcite and aragonite types, both being thus unpreferable.

Then, carbon dioxide gas (or gas containing carbon dioxide) is let through the mixed system of methanol, unslaked lime and/or slaked lime and water for carbonation reaction to proceed. The unit feeding rate of carbon dioxide gas is generally all right if, in the curve showing the variation of conductivity within the carbonation reaction system in FIG. 1, the time elapsed from the start point A of carbonation reaction to the point D where the conductivity reaches $100\mu$ S/cm is less than 1,000 minutes, preferably less than 600 minutes. Hence, if the reaction efficiency of carbon dioxide is, for example, 100%, carbonation reaction is normally started with carbon dioxide gas being fed at a unit feeding rate of 0.037 liter/minute per mol of unslaked lime in the reaction system, feeding of carbon dioxide gas is continued until pH in the reaction system is in the vicinity of 6.5 and, when the conductivity within the reaction system has reached $100\mu$ S/cm (point D in FIG. 1), vaterite type calcium carbonate according to the first invention is manufactured without fail. Even if feeding of carbon dioxide gas should be stopped with pH in the reaction system at 9.0, this pH value is caused to be lowered naturally under the influence of carbon dioxide gas et cetera remaining in methanol and the object of the second invention is accomplished if, when the conductivity in the reaction system has reached $100\mu$ S/cm (point D in FIG. 1), the time elapsed from the start of reaction system to the point D where the conductivity in the reaction system reaches the point D is less than 1,000 minutes.

In case spherical or ellipsoidal vaterite type calcium carbonate is intentionally manufactured by the method according to the second invention, the time elapsed from the start of carbonation reaction to where the conductivity in the carbonation reaction reaches the point D on the curve of conductivity variation in FIG. 1 is to be adjusted to less than 120 minutes, preferably less than 100 minutes. Especially if spherical vaterite type calcium carbonate is manufactured intentionally, the pH value in the reaction system is to be adjusted to 9.5±1.0. When ellipsoidal vaterite type calcium carbonate is manufactured intentionally, under the aforementioned conditions the pH value in the reaction system at the point D is to be adjusted to 7.0+1.5. When, on the other hand, plate-like vaterite type calcium carbonate is intentionally manufactured, the time elapsed from the start of carbonation reaction to where the conductivity in the carbonation reaction system reaches the point D is to be adjusted to 120 minutes or more but less than 1,000 minutes, preferably 120 minutes or more but less than 600 minutes.

Should the time elapsed from the start of carbonation reaction to where the conductivity in the carbonation reaction system reaches the point D fails to be less than 1,000 minutes and when, for example, the time required to reach the point D is 1,200 minutes, the shape of particles of calcium carbonate is almost bound to be rhizome-like or ring-like, this, needless to say, meaning failure to accomplish the object of the present invention.

Although the temperature of the mixture at the start of carbonation reaction is preferred to be more than 20° C., and more preferably more than 30° C. to ensure against gelation in the carbonation reaction process, the object of the present invention can be accomplished regardless of the temperature of the mixture at the start of carbonation reaction if the system temperature should rise to 30° C. or more, preferably 40° C. or more, before the conductivity in the carbonation reaction system reaches the point B on the conductivity curve in FIG. 1 showing the progress of conductivity in the carbonation reaction system.

If the system temperature should be below 30° C. prior to arrival at conductivity in the carbonation reaction system at the maximal point B, the viscosity of the carbonation reaction mixture is apt to rise sharply after arrival at the point B of the conductivity in the carbonation reaction system, this possibly interfering with continuance of the carbonation reaction.

Should the viscosity of the carbonation reaction mixture rise sharply, the carbonation reaction in the system is bound to be non-uniform even if the reaction is sustained by vigorous stirring, the consequence being poor uniformity of calcium carbonate particles and failure to obtain vaterite type calcium carbonate of good dispersibility.

Vaterite type calcium carbonate according to the first invention thus obtained not only has its mean particle size measured by the aid of an electron microscope being closely similar to the mean particle size measured by the aid of a particle size distribution measuring instrument but also is very sharp in particle size distribution, its particles being monodispersed, not aggregated in the dispersion medium.

Described below in detail is the third invention.

With vaterite type calcium carbonate according to the first invention having the aforementioned characteristic uniformity of primary particles as matrix, carbon dioxide gas is let through a mixed system of matrix vaterite type calcium carbonate, methanol, water and unslaked lime and/or slaked lime and carbonation reaction is carried out under conditions of 0.5-12 weight %, preferably 1-8 weight %, in converted unslaked lime solid concentration of matrix vaterite type calcium carbonate, unslaked lime and/or slaked lime with respect to the quantity of methanol, 3-30 times mol equivalent, preferably 5-20 times mol of water with respect to the unslaked lime concentration of unslaked lime and/or slaked lime, 5.6-11.5, preferably 5.8-10.0, in pH value in the carbonation reaction system and 15°-60° C., preferably 35°-55° C. in reaction temperature.

If the unslaked lime solid concentration of vaterite type calcium carbonate as matrix, unslaked lime and/or slaked lime is less than 0.5 weight % with respect to the quantity of methanol, the required quantity of methanol increases unduly, which is not only uneconomical but also presents difficulty with respect to the reaction conditions in the later steps of the carbonation reaction process with resultant extremely low yield of the vaterite type calcium carbonate of the present invention.

If it is in excess of 12 weight %, gelation is likely to occur in later steps of the carbonation reaction process and, worse, the shape and size of the calcium carbonate particles obtained are likely to become progressive non-uniform with simultaneous deterioration of dispersibility of the particles.

If the quantity of water added is less than 3 times mol, gelation is likely to occur in the later steps of the carbonation reaction process, while, if it is more than 30 times mol, the resulting calcium carbonate is mixed with various crystalline calcium carbonate of such as calcite and aragonite types, both being thus unpreferable.

When the pH value in the carbonation reaction system is less than 5.6, this manufacturing method can hardly be a preferable one, for there is then necessity of letting excessive quantity of carbon dioxide gas through the carbonation reaction system, this being uneconomical. When the pH value in the carbonation reaction system is more than 11.5, there occurs no growth of any novel vaterite type calcium carbonate on the surface of the matrix vaterite type calcium carbonate and then there is no possibility of growth of particles or morphological change of the matrix vaterite type calcium carbonate. If the pH value in the carbonation reaction system is more than 10.3 and less than 10.7, the growth rate of particles tends to be low, although the growth of particles and morphological change of the matrix vaterite type calcium carbonate can be attained. If the pH value in the carbonation reaction system is in a range of 10.7-11.3, the object of the present invention can be attained when vaterite type calcium carbonate of some specific particle shape is used as matrix but, if the method should be applied to matrix vaterite type calcium carbonate regardless of its particle shape, the permissible reaction conditions other than pH, for example, reaction temperature and the quantity of water, tend to be limited.

In order to further improve the uniformity of particle size and shape of the novel vaterite type calcium carbonate resulting from growth of particles, fluctuation of the pH in the carbonation reaction system is preferred to be as small as possible and it is preferable to be controlled within ±1.0, more preferable within ±0.5.

If 8.0 is selected as the set value for pH in the carbonation reaction system, it is difficult to keep the pH in the carbonation reaction system at 8.0 throughout the reaction process, hence it is preferable to have it controlled within a range of 8.0±1.0, more preferably 8.0±0.5.

As to the temperature in the carbonation reaction system, growth of any novel vaterite type calcium carbonate on the surface of the matrix vaterite type calcium carbonate is difficult if it is less than 15° C., and morphological non-uniformity is supposed to result about the particles of calcium carbonate formed, if any, this being apparently inadvisable. If the temperature is in excess of 60° C., it means necessity of using a reaction vessel of pressure-resistant type, this being not preferable economically.

As to the way of executing the third invention, there is no particular limitation if the aforementioned conditions are met. There are many alternative methods, for example, (1) a method of letting carbon dioxide gas through a mixed system of matrix vaterite type calcium carbonate, methanol, water and unslaked lime and/or slaked lime prepared to satisfy the aforementioned conditions, (2) a method of spraying the aforementioned mixture into an atmosphere of carbon dioxide gas, (3) a method of dripping the mixture of methanol, water and unslaked lime and/or slaked lime into the methanol suspension of matrix vaterite type calcium carbonate, (4) a method of dripping the methanol suspension of unslaked lime and/or slaked lime into the mixed system of matrix vaterite type calcium carbonate, methanol and water, and (5) a method of dripping a mixture of methanol, water and unslaked lime and/or slaked lime into a mixed system of vaterite type calcium carbonate, methanol and water. Of these alternatives, the method (5) will be described below in greater detail.

Carbon dioxide gas is let through a mixed system of methanol, matrix vaterite type calcium carbonate and water prepared by adding 3-30 times mol equivalent of water with respect to the converted unslaked lime value of the matrix vaterite type calcium carbonate to methanol suspension of the matrix vaterite type calcium carbonate whose converted unslaked lime solid concentration is 0.5-12 weight %, with vaterite type calcium carbonate according to the first invention having the characteristic uniformity of primary particles and dispersibility thereof as matrix. At the same time a mixed system of methanol, unslaked lime and/or slaked lime and water prepared by adding 3-30 times mol equivalent of water with respect to the quantity of unslaked lime (in case of slaked lime, conversion is made into unslaked lime of the same mol) to methanol suspension of unslaked lime and/or slaked lime whose converted unslaked lime concentration is 0.5-12 weight % is dripped with the pH in the carbonation system being controlled within a range of 5.6-11.5 and the reaction temperature within a range of 15°-60° C.

First, vaterite type calcium carbonates as matrix is put into methanol to prepare methanol suspension of the matrix vaterite type calcium carbonate. The solid concentration of the matrix vaterite type calcium carbonate may be in a range of 0.5-12 weight % as converted unslaked lime concentration, preferably 1-8 weight %.

Then, 3-30 times mol equivalent, preferably 5-20 times mol equivalent of water is added to prepare a mixed system of methanol, matrix vaterite type calcium carbonate and water (hereinafter called "mixture M1").

Thereafter, unslaked lime powder and/or slaked lime powder are put into methanol for preparation of methanol suspension of unslaked lime and/or slaked lime. The concentration of unslaked lime and/or slaked lime may be 0.5-12 weight %, preferably 1-8 weight %, with respect to methanol in terms of converted unslaked lime concentration (in case of slaked lime, the concentration thereof converted into unslaked lime, hereinafter called "unslaked lime concentration).

Next, 3-30 times mol equivalent, preferably 5-20 times mol equivalent of water with respect to unslaked lime is added to this methanol suspension of unslaked lime and/or slaked lime to prepare a mixed system of methanol, unslaked lime and/or slaked lime and water (hereinafter called "mixture M2").

Then, carbon dioxide gas is let through the mixed system M1 of the aforementioned methanol, matrix vaterite type calcium carbonate and water with simultaneous dripping of the mixed system M2 of the aforementioned methanol, unslaked lime and/or slaked lime and water for the carbonation reaction to proceed. The pH in the carbonation system may be in a range of 5.6-11.5, preferably 5.8-10.3 or 10.7-11.3 and, more preferably 5.8-10, and the reaction temperature in the carbonation system may be in a range of 15°-60° C., preferably 35°-55° C. for the carbonation reaction to proceed to thereby accomplish the object of the present invention easily.

The quantity of the mixture M2 dripped into the mixture M1 may be properly selected according to the particle size and the shape of the vaterite type calcium carbonate to be prepared. For example, when, with spherical vaterite type calcium carbonate selected as matrix, the mixture M2 containing the same quantity of unslaked lime as that of the converted unslaked lime of the matrix vaterite type calcium carbonate in the mixture M1 is dripped into the mixture M2 and the reaction conditions under which spherical particles are allowed to grow are selected for the carbonation reaction to proceed, novel spherical particles of vaterite type calcium carbonate approximately 1.25 times in particle size of the matrix spherical vaterite type calcium carbonate is obtained.

The dripping rate of the mixture M2 into the mixture M1 may be properly selected according to the particle size and shape of the vaterite type calcium carbonate, the form and volume of the reaction vessel used et cetera but when, from the viewpoint of improving the uniformity of individual particles of the vaterite type calcium carbonate obtained, the mixture M2 containing the same quantity of unslaked lime as that of the matrix spherical vaterite type calcium carbonate contained in the mixture M1 is dripped into the mixture M1, the dripping time may preferably be more than 1 hour, more preferably more than 2 hours.

As to the method of controlling the shape of the vaterite type calcium carbonate according to the third invention, the object of the invention may be easily accomplished by selecting the pH in the carbonation system from the range of pH set forth above. When, for example, plate-like vaterite type calcium carbonate is selected as matrix and the pH in the carbonation system is adjusted to 11, and the carbonation reaction is allowed to proceed, the shape of the resulting novel vaterite type calcium carbonate is plate-like being geometrically similar to the particles of the matrix plate-like vaterite type calcium carbonate, while, when the carbonation reaction is caused to proceed with the pH in the carbonation system adjusted to 9.5, the shape of the resulting novel vaterite type calcium carbonate is also plate-like being thicker than the matrix plate-like vaterite type calcium carbonate and smaller in aspect ratio. Further, when ellipsoidal vaterite type calcium carbonate is selected as matrix vaterite type calcium carbonate and the pH in the carbonation system is kept at 9.8, the shape of the resulting novel vaterite type calcium carbonate is spherical.

Thus, according to the third invention, it is possible to prepare vaterite type calcium carbonate in any desired particle size and shape mainly by selecting the particle shape of the matrix vaterite type calcium carbonate, adjusting the rate of dripping the mixture M2 and controlling the pH in the carbonation system. It is also possible to change the shape of the spherical vaterite type calcium carbonate to be ellipsoidal or plate-like, to say nothing of growing the spherical, ellipsoidal and plate-like particles of the matrix vaterite type calcium carbonate with geometrical similarity maintained.

When a vaterite type calcium carbonate with characteristically good dispersibility is adopted as matrix vaterite type calcium carbonate, the resulting novel vaterite type calcium carbonate has its mean particle size determined by the aid of an electron microscope closely similar invariably to that determined by the aid of a particle size distribution tester, is quite sharp in particle size distribution and is free from aggregation in the dispersion medium, being monodispersed.

When, according to the second and the third invention, slaked lime is used instead of unslaked lime, calcium carbonate of the present invention is obtainable, indeed, but the permissible ranges for the individual reaction conditions in the carbonation reaction process are much narrower than when unslaked lime is used, the content of vaterite type calcium carbonate in the calcium carbonate obtained upon completion of carbonation reaction lowers and, worse, it sometimes deteriorate the stability-with-time of vaterite type calcium carbonate, hence it is advisable to use for preparation of the aforementioned methanol suspension favorably a mixture of unslaked lime and slaked lime and, more favorably unslaked lime.

Preferred activity of unslaked lime is not less than 80, and the method of measuring is as follows. Activity: Fill a beaker 1,000 ml with 500 ml of deionized water of 40° C. and, after adding 2-3 drops of phenolphthalein under stirring, add 10 g of unslaked lime at once and start stopping the time with a stopwatch. After lapse of 1 minute drip 4N-HCl continuously so that the slight red coloration of the solution is maintained. Record the total of the dripped quantity of 4N-HCl at intervals of 1 minute and continue it for 20 minutes. The activity is displayed by the total of the dripped quantity (ml) after the lapse of 10 minutes.

Unslaked lime and slaked lime used in the method of the present invention are preferably used after dry-grinding by the use of a dry grinder or after wet-grinding of unslaked lime and slaked lime after wet-grinding of methanol suspension of unslaked lime and/or slaked lime by the use of a wet grinder to ensure its particle size to be constant within narrow limits.

Methanol used in the method of the present invention is preferred to be 100% methanol for ease of solid-liquid separation including steps of drying, condensation et cetera, but it is all right if not more than 20% of the weight of methanol is substituted by other alcohols, for example, monovalent, divalent and trivalent alcohols with a carbon number of not more than 4.

The carbonation reaction for obtaining the vaterite type calcium carbonate of the present invention is carried out using carbon dioxide or carbonate compounds. The carbon dioxide used need not be gaseous, and may as well be in the solid form such as dry ice. Carbon dioxide-containing gas, 30 volume % or so in concentration obtainable from waste gas from calcination of limestone may be used as well.

It is also possible to do solid-liquid separation of dispersions having dispersed therein vaterite type calcium carbonate of the present invention and reuse methanol separated thereby for synthesis of calcium carbonate.

By adding carboxylic acid, its alkaline salts et cetera to a dispersion of the vaterite type calcium carbonate of the present invention, the stability of the vaterite type calcium carbonate may possibly be further improved and it is then possible to obtain dispersion of vaterite type calcium carbonate having a good dispersibility excelled in long-term stability.

It is easy to substitute methanol in a dispersion by some other organic solvent and, for example, ethylene glycol slurry of monodispersed vaterite type calcium carbonate spherical, ellipsoidal or plate-like is a good anti-blocking agent for polyester fiber, polyester film and the like.

Further, vaterite type calcium carbonate excelled in dispersibility is obtainable by adding fatty acid, resin acid or alkaline salts thereof to the vaterite type calcium carbonate of the present invention, and calcium carbonate so obtained, with its excellent optical properties, dynamic properties, good fluidity and filling property, is widely usable as body pigment for paints and inks, as fillers for rubber and plastics, as pigment for paper-making as well as cosmetics.

Hereinafter, examples of the present invention will be given but it is to be understood that the invention is, needless to say, to be limited in no way thereto.

The measurement instruments used were:
pH measurement: Yokogawa Denki's Personal pH meter PH81-11-J
Conductivity: Toa Denpa Kogyo's Electroconductivity meter M-40S. The standard temperature is 25° C.

REFERENCE EXAMPLE 1

Preparation of dispersed methanol suspension for use in examples and comparative examples Powdery unslaked lime (special grade chemical), 82 in activity or slaked lime (special grade chemical) were ground by the use of a dry grinder (Alpine Co.'s Colloplex), the ground unslaked lime was put into methanol and, after removal of coarse particles by the use of a 200 mesh, methanol suspension unslaked lime or slaked lime, 20% in solid concentration was obtained. The methanol suspension so prepared was ground by the use of a wet grinder (WAB Co.'s Dynomill PILOT) and two kinds of dispersed methanol suspension of unslaked lime or slaked lime were prepared.

EXAMPLE 1

Methanol was added to the dispersed methanol suspension of unslaked lime prepared in Reference Example 1 to dilute it to an unslaked lime concentration of 3.0 weight % and, thereafter, 11 times mol equivalent of water to the weight of unslaked lime was added to prepare a mixed system of methanol, unslaked lime and water. After adjusting the temperature of this mixture containing 200 g of unslaked lime to 42° C., carbon dioxide gas was let through the mixture under stirring at a rate of 0.082 mol/min. per mol of unslaked lime to start the carbonation reaction. It was so adjusted for the conductivity in the system to reach the maximal point 5 minutes after the start of the carbonation reaction, and the reaction temperature in the system was adjusted to be 45° C. at the maximal point (equivalent to the point B in FIG. 1). The carbonation reaction was continued thereafter and 19 minutes after the start of the reaction, feeding of carbon dioxide gas was stopped at the point where the conductivity in the system reached $100\mu$ S/cm (equivalent to the point D in FIG. 1) to terminate the reaction.

Figure 2:
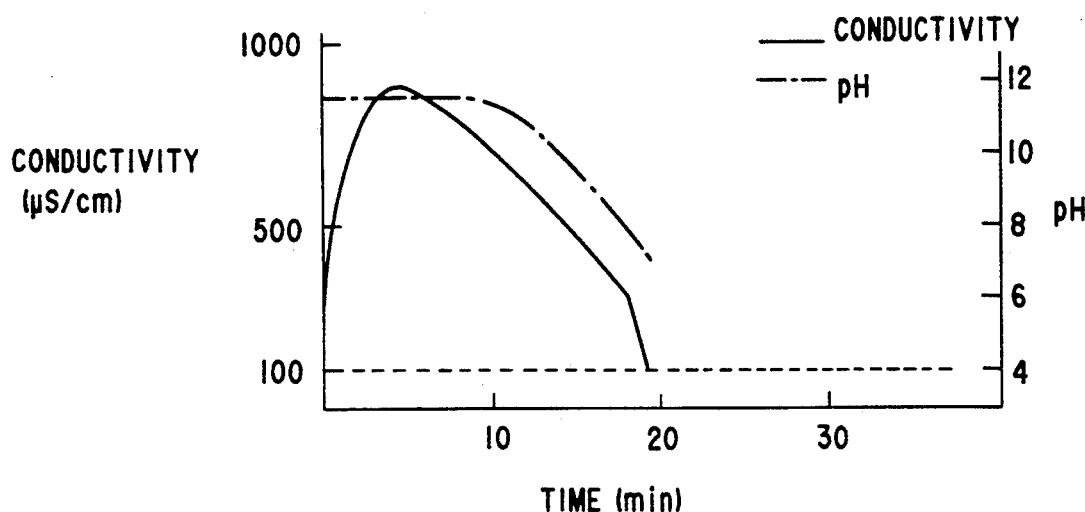
FIG. 2 shows measurement results of conductivity and pH in carbonation reaction system in Example 1.

The pH in the system at the point D was 7.0. The result of measurement of conductivity as well as pH in the system during the carbonation reaction of Example 1 is shown in FIG. 2.

The carbonation reaction conditions for Example 1 were as shown in Table 1.

Figure 3:
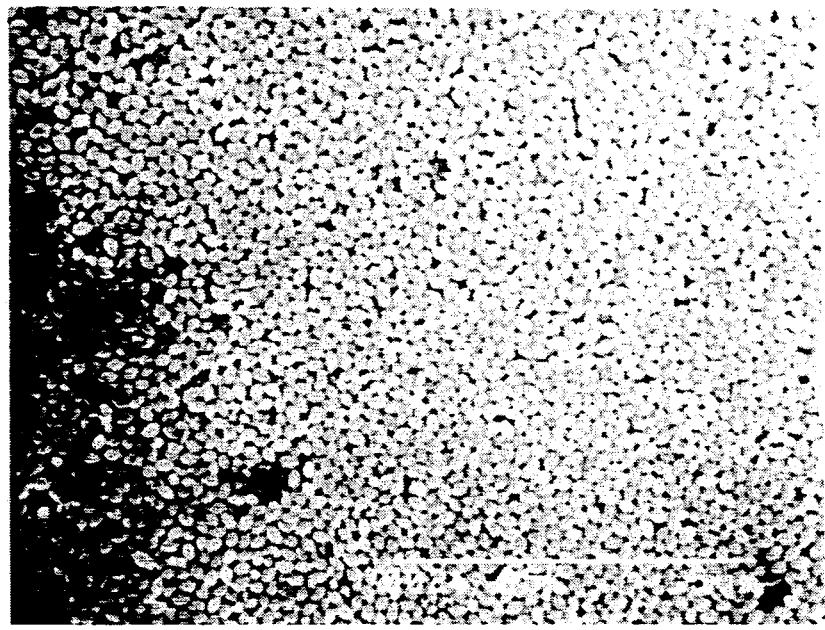
FIG. 3 shows an electron microscopic picture of vaterite type calcium carbonate obtained in Example 1.

Further, the physical properties of the vaterite type calcium carbonate obtained in Example 1 are shown in Table 3 and the scanning electron microscopic picture is shown in FIG. 3.

The calcium carbonate obtained in Example 1 was confirmed to be one of 100% varite structure by X-ray diffraction measurement.

Further, the calcium carbonate obtained in Example 1 was confirmed to be of ellipsoidal vaterite type well dispersible and almost free from secondary aggregation by the experimental data of Table 3 and FIG. 3.

EXAMPLES 2 AND 3

Calcium carbonate was synthesized in the same way as in Example 1 except that the preparation parameters given in Example 1 were changed to those shown in Table 1.

The physical properties of the vaterite type calcium carbonates obtained in Examples 2 and 3 are shown in Table 3.

The calcium carbonates obtained in Examples 2 and 3 were confirmed to be of 100% vaterite structure by X-ray diffraction measurement.

Further, the calcium carbonates obtained in Examples 2 and 3 were confirmed to be of ellipsoidal vaterite type well dispersible and almost free from secondary aggregation by the experimental data of Table 3.

EXAMPLE 4

The carbonation reaction was started in the same way as in Example 1 and feeding of carbon dioxide gas was stopped 13 minutes later when the system pH reached 10.0. After stopping of feeding carbon dioxide gas, the stirring in the system was continued and 20 minutes after the start of the carbonation reaction the conductivity in the system reached $100\mu$ s/cm.

Figure 4:
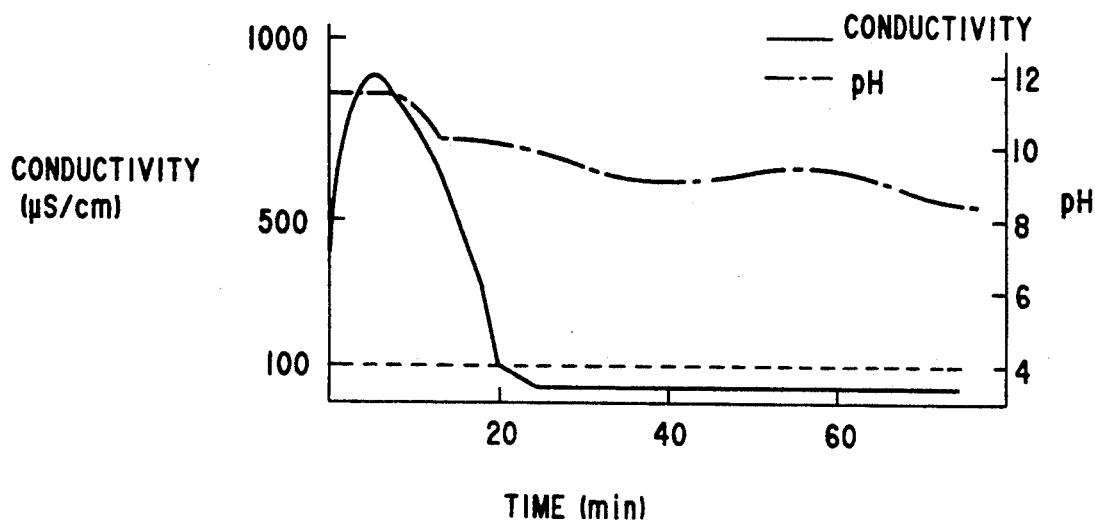
FIG. 4 shows measurement results of conductivity and pH in carbonation reaction system in Example 4.

The pH in the system at the point D was 9.7. The result of measurement of conductivity as well as pH in the system during the carbonation reaction of Example 4 is shown in FIG. 4.

The carbonation reaction conditions for Example 4 were as shown in Table 1.

Figure 5:
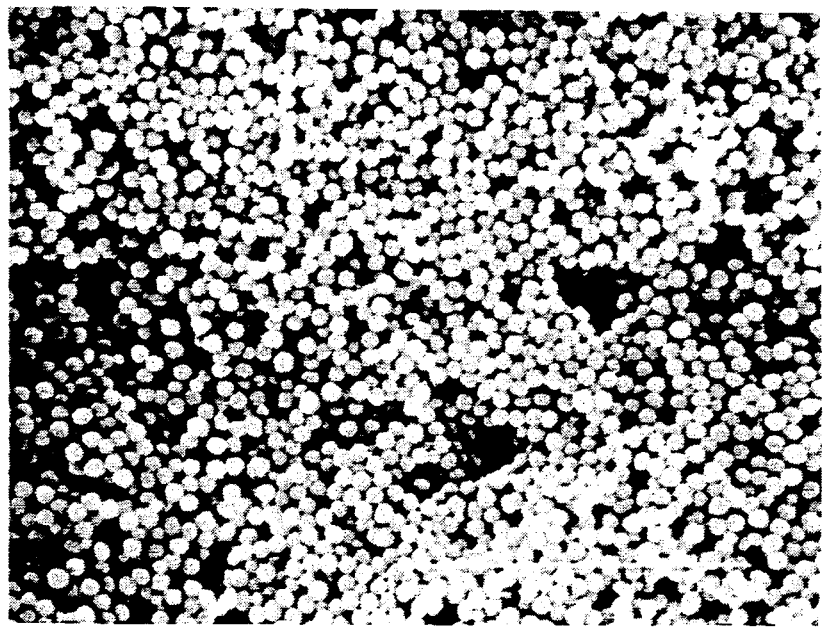
FIG. 5 shows an electron microscopic picture of vaterite type calcium carbonate obtained in Example 4.

Further, the physical properties of the vaterite type calcium carbonate obtained in Example 4 are shown in Table 3 and the scanning electron microscopic picture is shown in FIG. 5.

The calcium carbonate obtained in Example 4 was confirmed to be one of 100% varite structure by X-ray diffraction measurement.

Further, the calcium carbonate obtained in Example 4 was confirmed to be of spherical vaterite type well dispersible and almost free from secondary aggregation by the experimental data of Table 3 and FIG. 5.

EXAMPLE 5

Calcium carbonate was synthesized in the same way as in Example 4 except that the preparation parameters of Example 4 shown in Table 1 were changed to those shown in Table 1.

The carbonation reaction conditions for Example 5 are shown in Table 1.

Figure 6:
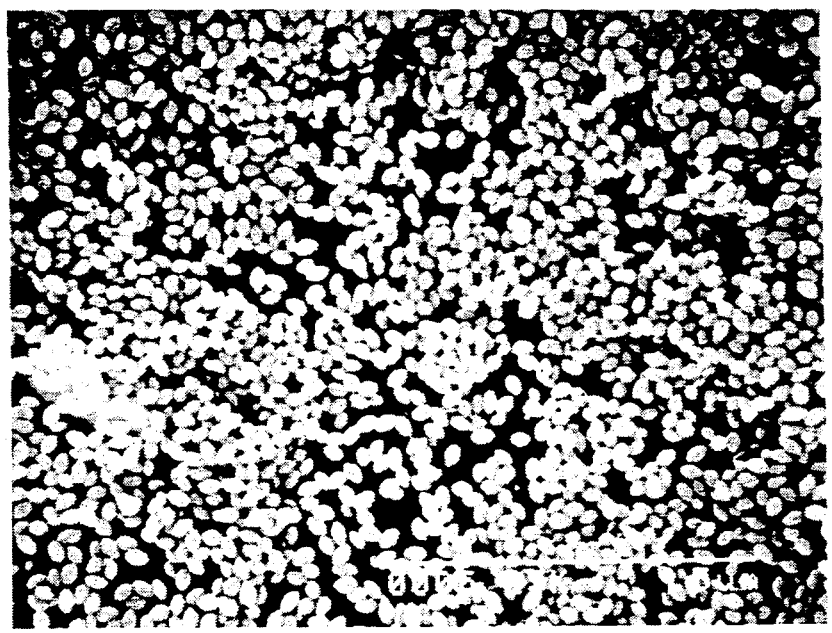
FIG. 6 shows an electron microscopic picture of vaterite type calcium carbonate obtained in Example 5.

The physical properties of the vaterite type calcium carbonate obtained in Example 5 are shown in Table 3 and the picture taken through a scanning electron microscope is shown in FIG. 6.

The calcium carbonate obtained in Example 5 was confirmed to be of 100% vaterite structure by X-ray diffraction measurement.

Further, the calcium carbonate obtained in Example 5 was confirmed to be of ellipsoidal vaterite type well dispersible and almost free from secondary aggregation by the experimental data of Table 3 and FIG. 6.

EXAMPLE 6

Calcium carbonate was synthesized in the same way as in Example 1 except that the dispersed methanol suspension of unslaked lime used in Example 1 was replaced by the dispersed methanol suspension of slaked lime obtained in Reference Example 1 and further the preparation parameters for Example 1 were changed to those shown in Table 1.

The calcium carbonate obtained in Example 6 was confirmed to be of 90% vaterite structure by X-ray diffraction measurement.

The physical properties of the vaterite type calcium carbonate obtained in Example 6 are shown in Table 3.

Further, the calcium carbonate obtained in Example 6 was confirmed to be of ellipsoidal vaterite type well dispersible and almost free from secondary aggregation by the experimental data of Table 3.

COMPARATIVE EXAMPLE 1

Carbonation reaction was carried out in the same way as in Example 1 except that the preparation parameters in Example 1 were changed to those shown in Table 2. The carbonation reaction, however, had to be terminated, for, as the reaction was still in progress, the viscosity of the reaction mixture in the system rose sharply and the reaction mixture in the system came to be sherbet-like to interfere with continuance of the reaction.

COMPARATIVE EXAMPLES 2, 3 AND 4

Calcium Carbonate was synthesized in the same way as in Example 1 except that the preparation parameters given in Example 1 were changed to those shown in Table 2.

The physical properties of the vaterite type calcium carbonates obtained in Comparative Examples 2, 3 and 4 are shown in Table 4.

The calcium carbonates obtained in Comparative Examples 2 and 4 are found to be of very poor dispersibility from the data in Table 4.

The vaterite type calcium carbonate obtained in Comparative Example 3 was found contaminated by many calcium carbonate particles of calcite type and aragonite type by X-ray diffraction measurement, and also confirmed to be broad in particle size distribution and inferior in quality by the experimental data in Table 4.

COMPARATIVE EXAMPLE 5

First, milk of lime prepared by adding water to unslaked lime was adjusted to be 1.070 in specific gravity and to 10° C., and furnace gas with a carbon dioxide gas concentration of 25 weight % was let through the milk of lime at a rate of 20 m$^3$/min for carbonation reaction to proceed until it was terminated with pH at 6.5. The temperature of the aqueous suspension of calcium carbonate having undergone carbonation reaction was adjusted to 50° C. and was stirred for 24 hours. The calcium carbonate thus obtained was of the calcite type and its primary particle size read from scanning electron microscopic picture was 0.2 μm. This aqueous dispersion of calcium carbonate was dehydrated in a normal manner, to the resulting dehydrated cake 1.5 weight % of sodium acrylate was added on the weight of solid calcium carbonate and an aqueous slurry of calcium carbonate, 35 weight % in solid concentration was obtained by subsequent vigorous stirring. The aqueous slurry was wet-ground by letting it pass through a wet grinder (WAB Co.'s Dynomill Pilot Type, media charging rate 80%, media size 0.6–0.9 mm, 1,500 rpm.) 10 times at a flow rate of 60 ml/min. for dispersion of aggregates.

Figure 7:
FIG. 7 shows an electron microscopic picture of calcium carbonate obtained in Comparative Example 5.

The physical properties of calcium carbonate obtained in Comparative Example 5 are shown in Table 4 and its scanning electron microscopic picture is shown in FIG. 7.

From the experimental data in Table 4 and FIG. 7, it was certain that the calcium carbonate obtained in Comparative Example 5 was broad in particle size distribution and the shape of its particles was ununiform, despite repeated violent wet-grinding.

EXAMPLE 7

Methanol was added to the aforementioned dispersed methanol suspension of unslaked lime prepared in Reference Example 1 to dilute it to an unslaked lime concentration of 3.8 weight % and, thereafter, 11 times mol equivalent of water on the weight of unslaked lime was added to prepare a mixed system of methanol, unslaked lime and water. After adjusting the temperature of this mixture containing 200 g of unslaked lime to 42° C., carbon dioxide gas was let through the mixture under stirring at a rate of 0.0033 mol/min. per mol of unslaked lime to start the carbonation reaction. It was so adjusted for the conductivity in the system to reach the maximal point 8 minutes after the start of the carbonation reaction, and the reaction temperature in the system was adjusted to be 45° C. at the maximal point (equivalent to the point B in FIG. 1). The carbonation reaction was continued thereafter and 300 minutes after the start of the reaction feeding of carbon dioxide gas was stopped at the point where the conductivity in the system reached 100μ s/cm (equivalent to the point D in FIG. 1) to terminate the reaction.

Figure 8:
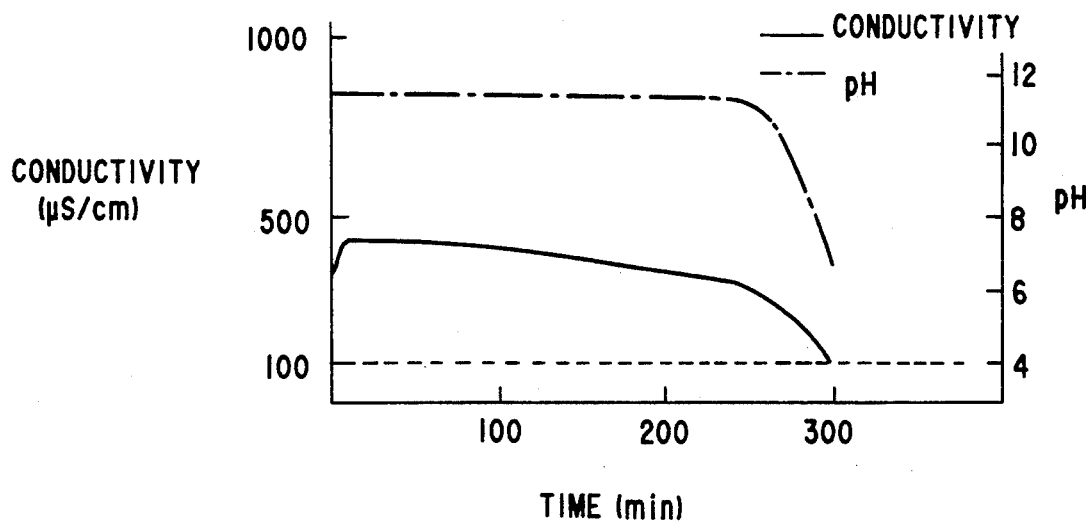
FIG. 8 shows measurement results of conductivity and pH in carbonation reaction system in Example 7.

The pH in the system at the point D was 6.8. The result of measurement of conductivity as well as pH in the system during the carbonation reaction of Example 7 is shown in FIG. 8.

The carbonation reaction conditions for Example 7 were as shown in Table 5.

The calcium carbonate obtained in Example 7 was confirmed to be of 100% varite structure by X-ray diffraction measurement. The physical properties of this vaterite type calcium carbonate are shown in Table 7 and its scanning electron microscopic picture is shown in FIG. 9.

Figure 9:
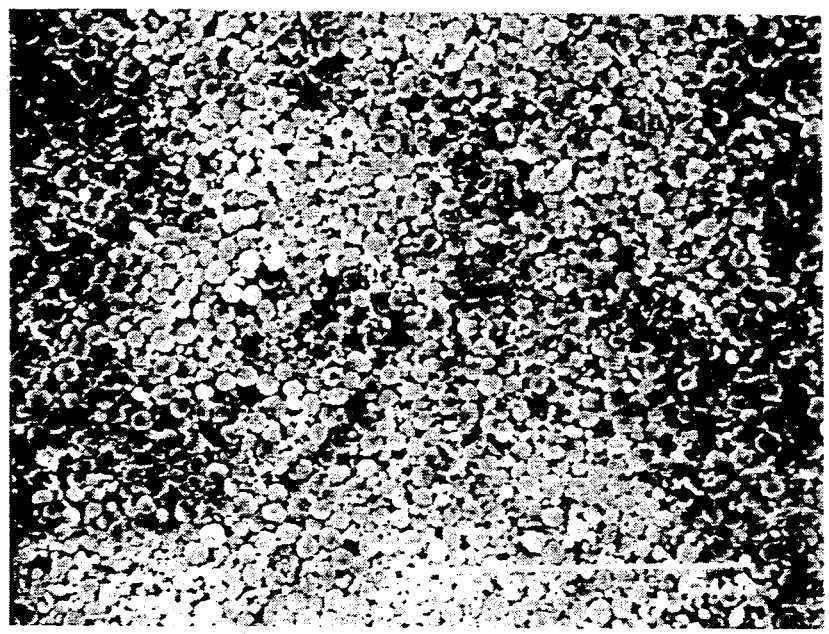
FIG. 9 shows an electron microscopic picture of vaterite type calcium carbonate obtained in Example 7.

Further, the calcium carbonate obtained in Example 7 was confirmed to be of plate-like vaterite type well dispersible and almost free from secondary aggregation by the experimental data of Table 7 and FIG. 9.

EXAMPLES 8 AND 9

Calcium carbonate was synthesized in the same way as in Example 7 except that the preparation parameters of Example 7 shown in Table 5 were changed to those shown in Table 5.

The calcium carbonates obtained in Examples 8 and 9 were confirmed to be of 100% vaterite structure by X-ray diffraction measurement. The physical properties of these vaterite type calcium carbonates are shown in Table 7.

Further, the calcium carbonates obtained in Examples 8 and 9 were confirmed to be of plate-like vaterite type well dispersible and almost free from secondary aggregation by the experimental data of Table 7.

EXAMPLE 10

The carbonation reaction was started in the same way as in Example 7 and feeding of carbon dioxide gas was stopped 145 minutes later when the system pH reached 11.0. After stopping of feeding carbon dioxide gas, the stirring in the system was continued and 240 minutes after stopping of feeding of carbon dioxide gas its feeding was resumed at the same rate for the carbonation reaction to proceed. The conductivity in the system reached 100μ S/cm 540 minutes after the start of the carbonation reaction.

Figure 10:
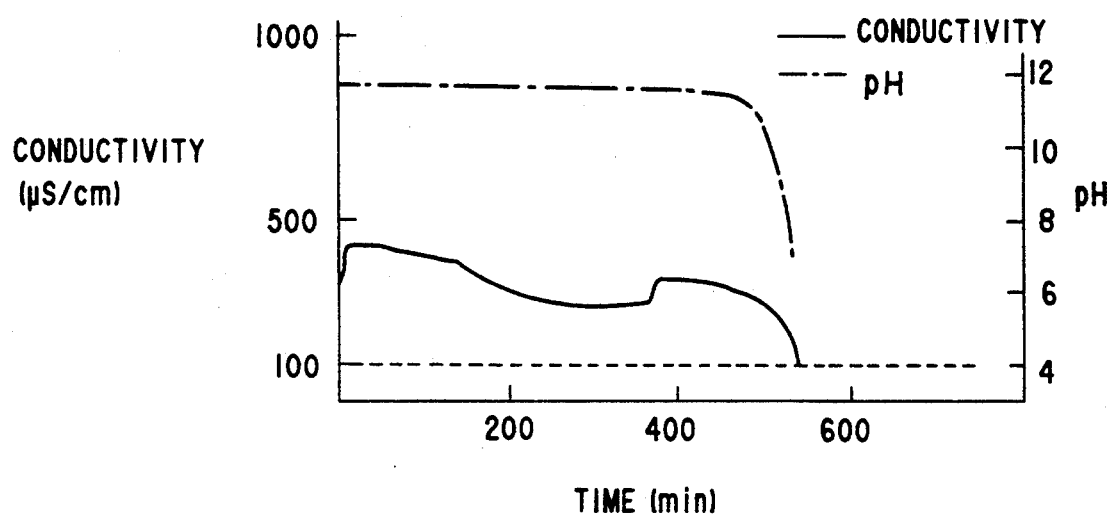
FIG. 10 shows measurement results of conductivity and pH in carbonation reaction system in Example 10.

The pH in the system at the point D was 6.8. The result of measurement of conductivity as well as pH in the system during the carbonation reaction of Example 10 is shown in FIG. 10.

The carbonation reaction conditions for Example 10 were as shown in Table 5.

The calcium carbonate obtained in Example 10 was found to be of 95% vaterite structure from the result of X-ray diffraction measurement. The physical properties of this vaterite type calcium carbonate are shown in Table 7, and its scanning electron microscopic picture is shown in FIG. 11.

Figure 11:
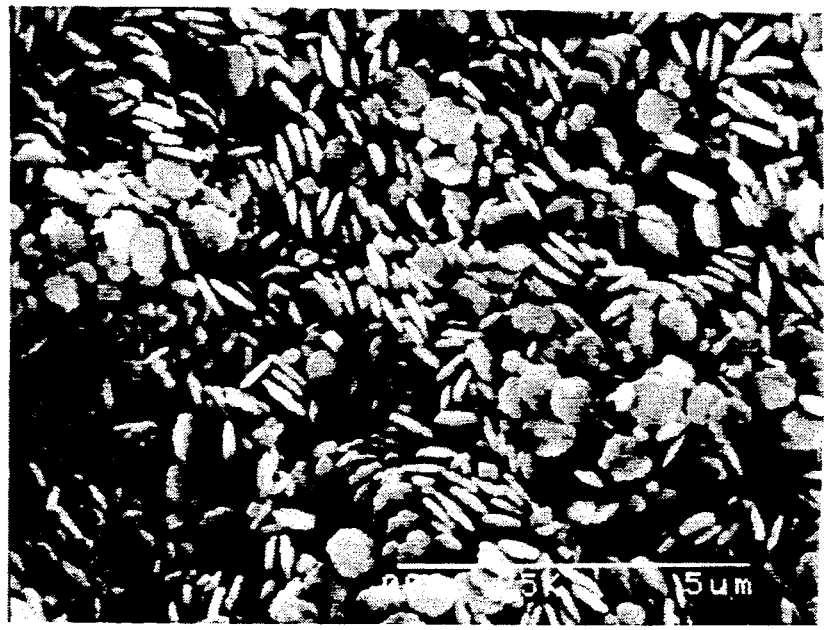
FIG. 11 shows an electron microscopic picture of vaterite type calcium carbonate obtained in Example 10.

The calcium carbonate obtained in Example 10 was confirmed to be plate-like vaterite type calcium carbonate good in dispersibility and almost free from secondary aggregation by the experimental data in Table 7 and FIG. 11.

EXAMPLE 11

The carbonation reaction was started in the same way as in Example 7 except that the dispersed methanol suspension of unslaked lime was replaced by that of slaked lime and that the preparation parameter of Example 7 were changed to those given in Table 5.

The calcium carbonate obtained in Example 11 was confirmed to be of 90% vaterite structure by X-ray diffraction measurement. The physical properties of this vaterite type calcium carbonate are shown in Table 7.

Further, the calcium carbonate obtained in Example 11 was confirmed to be of plate-like vaterite type well dispersible and almost free from secondary aggregation by the experimental data of Table 7.

COMPARATIVE EXAMPLES 7, 8 AND 9

Calcium carbonates were synthesized in the same way as in Example 1 except that the preparation parameters of Example I shown in Table 7 were changed to those given in Table 6.

The physical properties of the calcium carbonates obtained in Examples 7, 8 and 9 are shown in Table 8.

Figure 12:
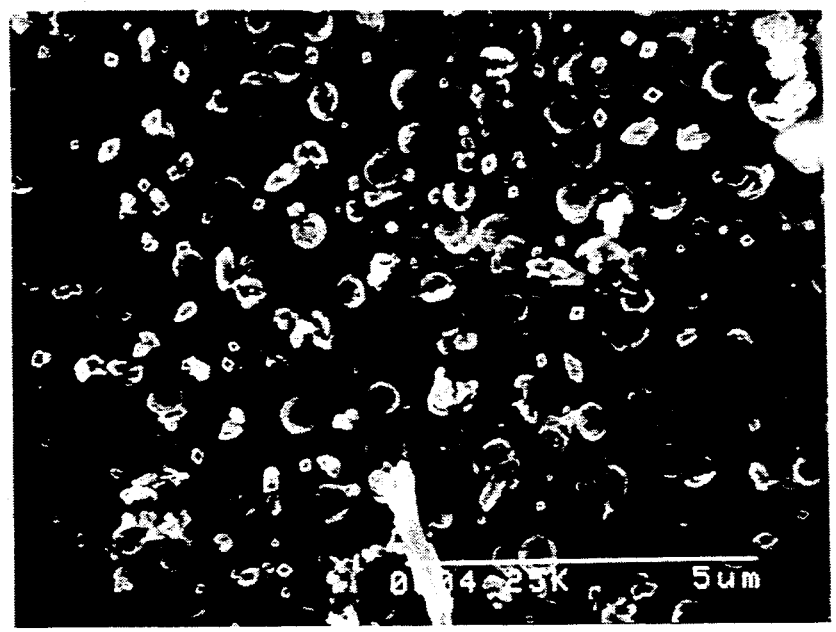
FIG. 12 shows an electron microscopic picture of calcium carbonate obtained in Comparative Example 9.

The scanning electron microscopic picture of the calcium carbonate obtained in Comparative Example 9 is shown in FIG. 12.

The calcium carbonate obtained in Comparative Example 7 turned out to be aggregates of fine particles containing amorphous calcium carbonate as the result of X-ray diffraction measurement and from its scanning electron microscopic picture, hence not falling under the category of the present invention.

The calcium carbonate obtained in Comparative Example 8 turned out to be a mixture of bar-like aragonite calcium carbonate and cubic calcite type calcium carbonate as the result of X-ray diffraction measurement and from its scanning electron microscopic picture, hence not falling under the category of the present invention.

The calcium carbonate obtained in Comparative Example 9 turned out to be lotus root-like or ring-shaped calcium carbonate, hence not falling under the category of the present invention.

COMPARATIVE EXAMPLE 10

Milk of lime of 9.8 g/100 ml in calcium hydroxide concentration was prepared by putting unslaked lime into water, the milk of lime so prepared was cooled and carbon dioxide gas was let through it under ststirring at a carbonation starting temperature of 15° C. at a rate of 4.7 ml/min. per gram of calcium carbonate in the milk of lime and the carbonation reaction was caused to proceed until the carbonation ratio reached 15%. Then, carbon dioxide gas was further let through the same at a rate of 9.3 ml/min. per gram of calcium carbonate in the milk of lime and the carbonation reaction was caused to further proceed until the carbonation ratio reached 65% and a product of 65% in carbonation ratio was obtained. This product was then filtered, dehydrated, washed with methanol and dried at 100° C. and plate-like basic calcium carbonate was thus obtained. The obtained plate-like basic calcium carbonate was heated for carbonation for 5 hours in an electric furnace with the temperature inside controlled at 500° C. and carbon dioxide gas fed in at a rate of 1 liter/min.

The physical properties of the plate-like calcium carbonate obtained in Comparative Example 10 are show in Table 8.

The data in Table 8 show that the plate-like calcium carbonate obtained in Comparative Example 10 is calcium carbonate extremely poor in dispersibility.

Hereinafter, vaterite type calcium carbonate to be used in Examples 12–18 and Comparative Examples 11–16 as matrix for particle growth and particle shape control will be explained.

REFERENCE EXAMPLE 2

Methanol-water suspension of matrix vaterite type calcium carbonate A

Spherical vaterite type calcium carbonate obtained in Example 4 and methanol-water suspension thereof.

REFERENCE EXAMPLE 3

Methanol-water suspension of matrix vaterite type calcium carbonate B

Ellipsoidal vaterite type calcium carbonate obtained in Example 5 and methanol-water suspension thereof.

REFERENCE EXAMPLE 4

Methanol-water suspension of matrix vaterite type calcium carbonate C

Methanol-water suspension of plate-like vaterite type calcium carbonate obtained by adding methanol to the methanol-water suspension of the plate-like vaterite type calcium carbonate obtained in Example 7 for dilution to 3.0 weight % in converted unslaked lime concentration of vaterite type calcium carbonate with respect to total methanol.

EXAMPLE 12

Methanol was added to the dispersed methanol suspension of unslaked lime obtained in Reference Example 1 for dilution thereof to 3.0 weight % in unslaked lime concentration and, further, 11 times mol equivalent of water was added to unslaked lime for preparation of a mixed system of methanol-unslaked lime-water. From this mixture a quantity containing 200 g of unslaked lime was taken out and then dripped into methanol-water suspension of the matrix spherical vaterite type calcium carbonate A obtained in Reference Example 2 with simultaneous start of letting carbon dioxide gas therethrough for carbonation reaction to proceed.

The dripping rate of the aforementioned mixture was controlled to 0.833 g per minute in terms of unslaked lime, the temperature in the carbonation reaction system to 41±1° C. and pH in the carbonation system to 8.8±0.1 for carbonation reaction to proceed under these conditions until it terminated approximately 240 minutes after the start thereof.

The calcium carbonate obtained in Example 12 turned out to be of 100% vaterite structure from the result of X-ray diffraction measurement.

It was also spherical vaterite type calcium carbonate geometrically similar to the spherical vaterite type calcium carbonate A used as matrix, approximately 1.25 times the particle size of the latter, being extremely good in dispersibility.

Figure 13:
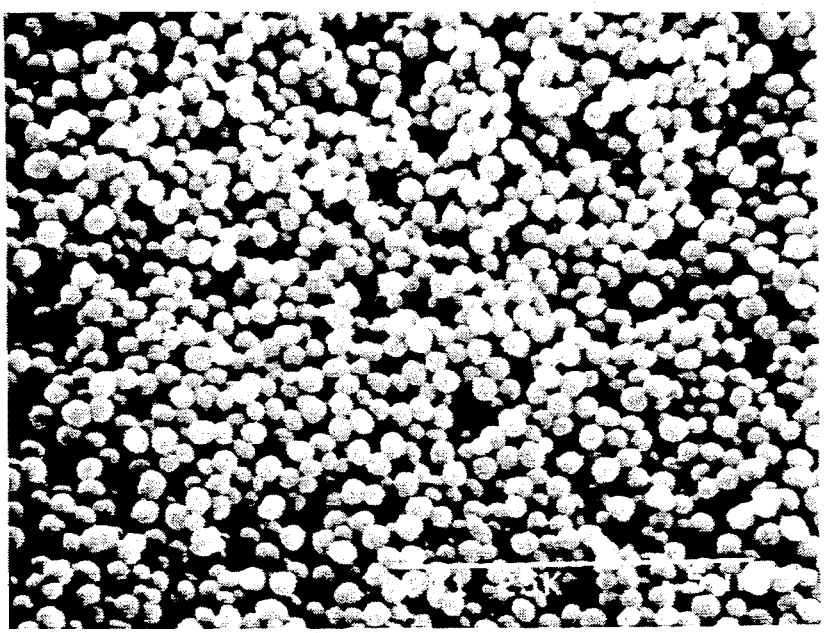
FIG. 13 shows an electron microscopic picture of vaterite type calcium carbonate obtained in Example 12.

The conditions for preparation of the calcium carbonate of Example 12 are shown in Table 9, its physical properties are shown in Table 11 and the scanning electron microscopic picture is shown in FIG. 13.

EXAMPLE 13

Methanol was added to the dispersed methanol suspension of unslaked lime obtained in Reference Example 1 for dilution thereof to 3.0 weight % in unslaked lime concentration and, further, 11 times mol equivalent of water was added to unslaked lime for preparation of a mixed system of methanol-unslaked lime-water. From the aforementioned mixture a quantity containing 1,600 g of unslaked lime was taken out and then dripped into methanol-water suspension of the matrix spherical vaterite type calcium carbonate A obtained in Reference Example 2 with simultaneous start of letting carbon dioxide gas therethrough for carbonation reaction to proceed.

The dripping rate of the aforementioned mixture was controlled to 0.833 g per minute in terms of unslaked lime, the temperature in the carbonation reaction system to 41±1° C. and pH in the carbonation system to 8.8±0.1 for carbonation reaction to proceed under these conditions until it terminated approximately 32 hours after the start thereof.

The carbonation reaction obtained in Example 13 turned out to be of 100% vaterite structure from the result of X-ray diffraction measurement.

It was also spherical vaterite type calcium carbonate highly uniform in particle size and geometrically similar to the spherical vaterite type calcium carbonate A used as matrix approximately 2.0 times the particle size of the latter, being extremely good in dispersibility.

Figure 14:
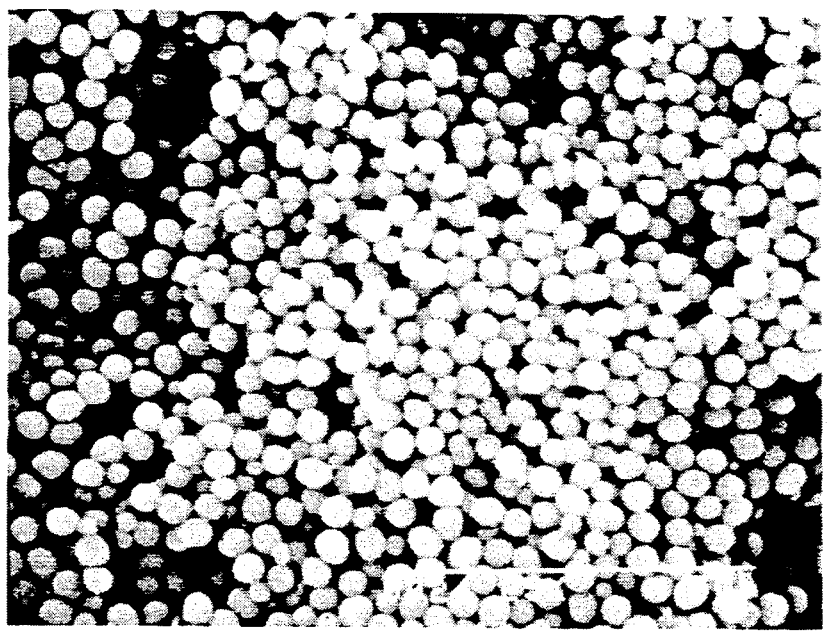
FIG. 14 shows an electron microscopic picture of vaterite type calcium carbonate obtained in Example 13.

The conditions for preparation of the calcium carbonate of Example 13 are shown in Table 9, its physical properties are shown in Table 11 and the scanning electron microscopic picture is shown in FIG. 14.

EXAMPLE 14

Carbonation reaction was carried out in the same way as in Example 13 except that methanol-water suspension of unslaked lime obtained in Reference Example 2 was changed to methanol-water suspension obtained in Reference Example 3, a quantity containing 1,600 g of unslaked lime was changed to a quantity containing 800 g of unslaked lime and pH 8.8±0.1 was changed to 9.8±0.1. The dripping and carbonation reaction terminated approximately 16 hours after the start thereof. The calcium carbonate obtained in Example 14 turned out to be of 100% vaterite structure from the result of X-ray diffraction measurement.

It was also spherical vaterite type calcium extremely uniform in particle size, extremely good in dispersibility.

Figure 15:
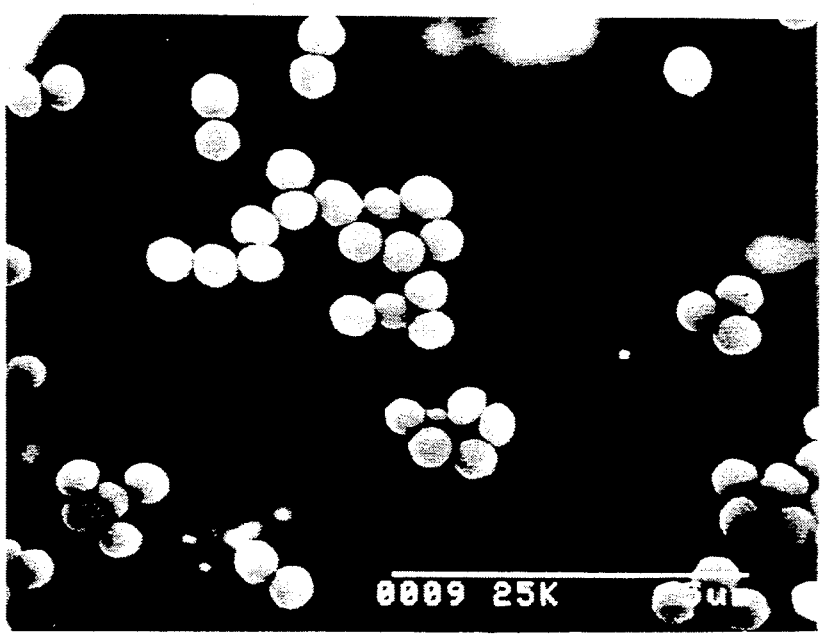
FIG. 15 shows an electron microscopic picture of vaterite type calcium carbonate obtained in Example 14.

The conditions for preparation of the calcium carbonate of Example 14 are shown in Table 9, its physical properties are shown in Table 11 and the scanning electron microscopic picture is shown in FIG. 15.

EXAMPLE 15

Carbonation reaction was carried out in the same way as in Example 12 except that methanol-water suspension of unslaked lime obtained in Reference Example 2 was changed to methanol-water suspension obtained in Reference Example 4 and pH 8.8±0.1 was changed to 11.0±0.1.

The calcium carbonate obtained in Example 15 turned out to be of 100% vaterite structure from the result of X-ray diffraction measurement.

It was extremely uniform in particle size and the plate-like vaterite type calcium carbonate C used as matrix was geometrically similar thereto and approximately 1.25 times in particle size thereof, its dispersibility being extremely good.

Figure 16:
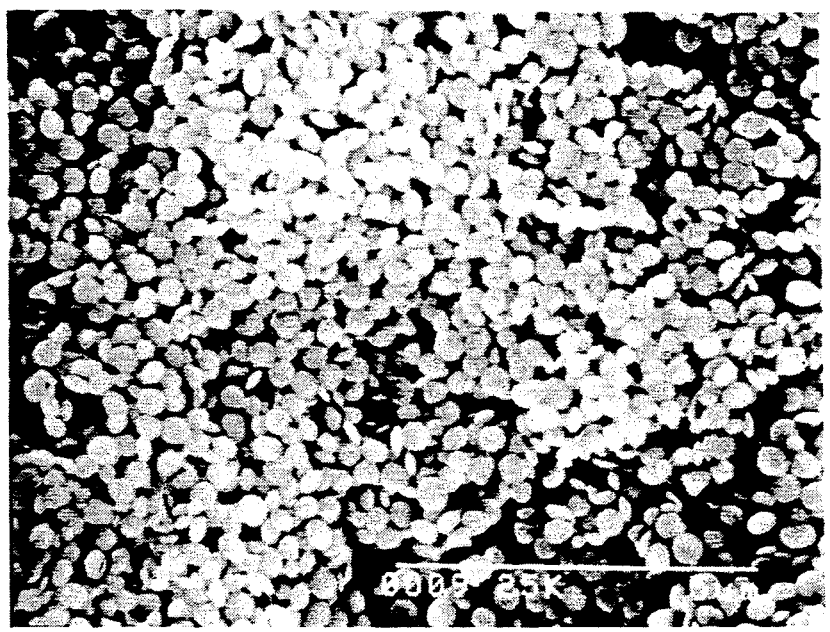
FIG. 16 shows an electron microscopic picture of vaterite type calcium carbonate obtained in Example 15.

The conditions for preparation of the calcium carbonate of Example 15 are shown in Table 9, its physical properties are shown in Table 12 and the scanning electron microscopic picture is shown in FIG. 16.

EXAMPLE 16

Carbonation reaction was carried out in the same way as in Example 15 except that pH 11.0±0.1 was changed to 9.5±0.1.

The calcium carbonate obtained in Example 16 turned out to be of 100% vaterite structure from the result of X-ray diffraction measurement.

It was extremely uniform in particle size and was larger in thickness compared with the plate-like vaterite type calcium carbonate C used as matrix, its dispersibility being extremely good.

Figure 17:
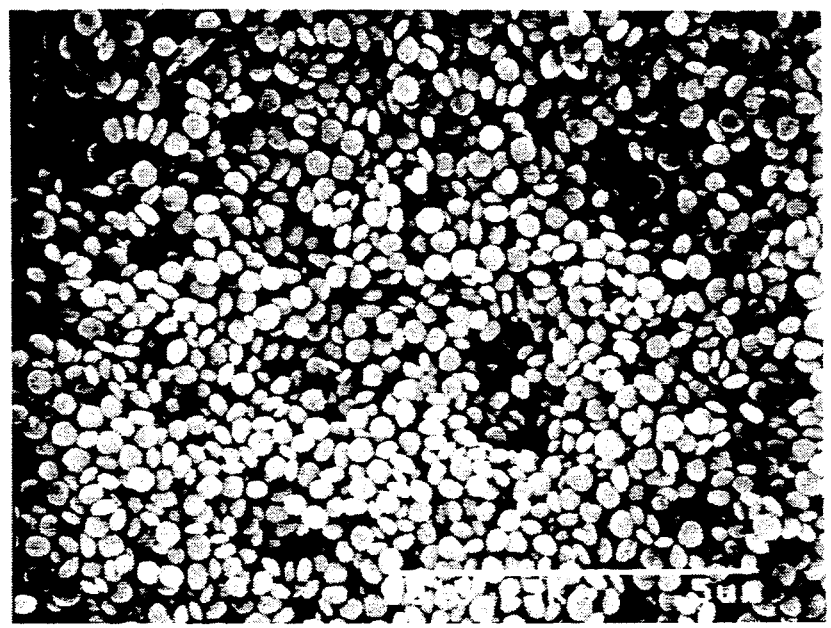
FIG. 17 shows an electron microscopic picture of vaterite type calcium carbonate obtained in Example 16.

The conditions for preparation of the calcium carbonate of Example 16 are shown in Table 9, its physical properties are shown in Table 12 and the scanning electron microscopic picture is shown in FIG. 17.

EXAMPLE 17

Methanol was added to the dispersed methanol suspension of unslaked lime obtained in Reference Example 1 for dilution thereof to 3.0 weight % in unslaked lime concentration and, further, 11 times mol equivalent of water was added to unslaked lime for preparation of a mixed system of methanol-unslaked lime-water. From the aforementioned mixture a quantity containing 50 g of unslaked lime was taken out and it was mixed with methanol-water suspension of matrix spherical vaterite type calcium carbonate A obtained in Reference Example 2 for preparation of matrix spherical vaterite type calcium carbonate A - unslaked lime - methanol - water mixed system with simultaneous start of letting through carbon dioxide gas for carbonation reaction to proceed.

Carbonation reaction was started with the reaction temperature controlled at 41±1° C. and the system pH in the range of 11.4–8.5 until it terminated approximately 60 minutes later when the pH in the reaction system reached 8.5.

Then, the same quantity of methanol - unslaked lime - water containing 50 g of unslaked lime was added. This procedure was repeated 3 times and a total of 200 g unslaked lime was added to the matrix spherical vaterite type calcium carbonate A for carbonation reaction to proceed.

The carbonation reaction obtained in Example 17 turned out to be of 98% vaterite structure from the result of X-ray diffraction measurement.

Although the calcium carbonate obtained in Example 17 was for the most part spherical vaterite type calcium carbonate geometrically similar to the spherical vaterite type calcium carbonate A used as matrix, approximately 1.25 times in particle size, but was found containing a small quantity of spherical vaterite type calcium carbonate much smaller in particle size, thus being somewhat poor in uniformity of particles and dispersibility compared with the spherical vaterite type calcium carbonate of Example 12. The conditions for preparation of the calcium carbonate of Example 17 are shown in Table 9 and its physical properties are shown in Table 12.

EXAMPLE 18

Carbonation reaction was carried out in the same way as Example 13 except that methanol-unslaked lime-water mixture containing 1,600 g of unslaked lime was changed to methanol-slaked lime-water mixture containing slaked lime in a quantity equivalent to 1,600 g when converted into unslaked lime.

The carbonation reaction obtained in Example 18 turned out to be of 90% vaterite structure from the result of X-ray diffraction measurement.

Figure 18:
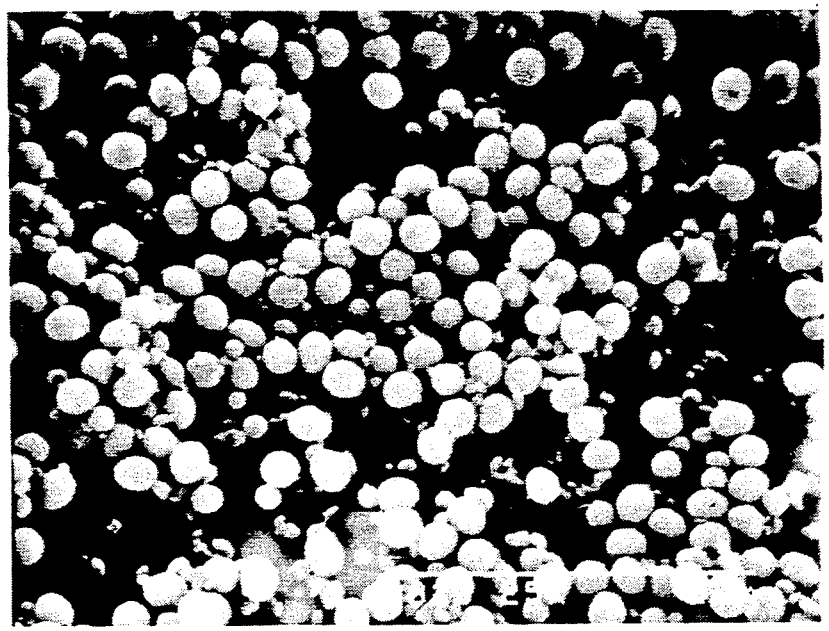
FIG. 18 shows an electron microscopic picture of vaterite type calcium carbonate obtained in Example 18.

Although the calcium carbonate obtained in Example 18 was for the most part spherical vaterite type calcium carbonate geometrically similar to the spherical vaterite type calcium carbonate A used as matrix, approximately 2.0 times in particle size, but was found containing a small quantity of spherical vaterite type calcium carbonate much smaller in particle size, thus being somewhat poor in uniformity of particles and dispersibility compared with the spherical vaterite type calcium carbonate of Example 13. The conditions for preparation of the calcium carbonate of Example 18 are shown in Table 9, its physical properties are shown in Table 12, and its scanning electron microscopic picture is shown in FIG. 18.

COMPARATIVE EXAMPLE 11

Carbonation reaction was carried out in the same way as in Example 12 except that the reaction temperature was changed from 41±1° C. to 37±1° C. and the pH from 8.8±0.1 to 11.7±0.1.

The calcium carbonate obtained in Comparative Example 11 was found to be calcium carbonate ununiform in particle size containing a large number of extremely fine particles not more than 0.1 μm in particle size, also being ununiform in shape of particles, partly spherical, plate-like and ellipsoidal. There was no indication of growth of particles on the spherical vaterite type calcium carbonate used as matrix.

Figure 19:
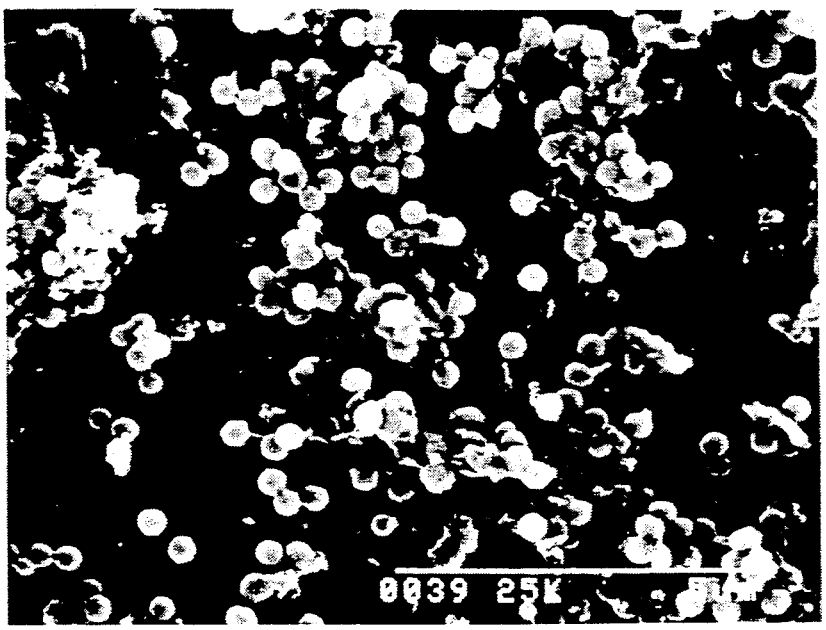
FIG. 19 shows an electron microscopic picture of calcium carbonate obtained in Comparative Example 11.

The preparation conditions for the calcium carbonate of Example 11 are shown in Table 10, its physical properties are in Table 13 and its scanning electron microscopic picture is in FIG. 19.

COMPARATIVE EXAMPLE 12

Carbonation reaction was carried out in the same way as Example 12 except that the reaction temperature was changed from 41±1° C. to 5±1° C.

In the course of carbonation reaction, however, the viscosity of the reaction mixture rose unduly to badly interfere with control of the reaction conditions such as stirring of the reaction mixture, passing-through rate of carbon dioxide gas and control of pH of the reaction mixture and the carbonation reaction had to be terminated halfway.

The carbonation conditions in Comparative Example 12 are shown in Table 10.

COMPARATIVE EXAMPLE 13

Methanol-water suspension of matrix spherical vaterite type calcium carbonate A including 35 times mol equivalent of water with respect to the converted quantity of unslaked lime equivalent to the quantity of the matrix was prepared by further adding water to the methanol-water suspension of the matrix spherical vaterite type calcium carbonate A prepared in Reference Example 2.

Methanol was added to the aforementioned dispersed methanol suspension of unslaked lime prepared in Reference Example 1 to dilute it to 3.0 weight % and then 35 times mol equivalent of water with respect to unslaked lime was added to prepare methanol - unslaked lime - water mixture. From this mixture a quantity containing 1,600 g of unslaked lime was taken out and then dripped into methanol - water suspension of the matrix spherical vaterite type calcium carbonate A including 35 times mol equivalent of water with respect to the converted quantity of unslaked lime for the matrix spherical vaterite type calcium carbonate A with simultaneous start of letting carbon dioxide gas therethrough for carbonation reaction to proceed under the same reaction conditions as in Example 13.

The calcium carbonate obtained in Example 13 contained, indeed, spherical vaterite type calcium carbonate grown from the spherical vaterite type calcium carbonate used as matrix but was also seen containing many large aggregates of aragonite type calcium carbonate, which is needle - shaped crystal, and calcite type calcium carbonate, which is cubic crystal.

Figure 20:
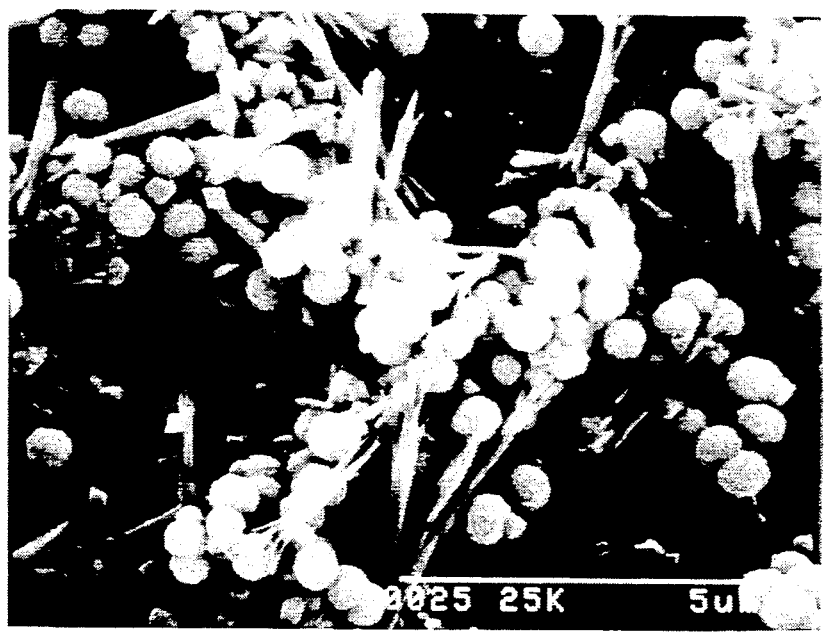
FIG. 20 shows an electron microscopic picture of calcium carbonate obtained in Comparative Example 13.

The conditions for preparation of the calcium carbonate of Example 13 are shown in Table 10, its physical properties are shown in Table 13 and the scanning electron microscopic picture is shown in FIG. 20.

COMPARATIVE EXAMPLE 14

Methanol was added to the dispersed methanol suspension of unslaked lime prepared in Reference Example 1 for dilution thereof to 3.0 weight % in unslaked lime concentration and thus a mixture of methanol - unslaked lime was prepared. Then, from this mixture a quantity containing 1,600 g of unslaked lime was taken out and it was dripped into the methanol - water suspension of the matrix spherical vaterite type calcium carbonate A obtained in Reference Example 2 with simultaneous start of letting carbon dioxide gas therethrough for carbonation reaction to proceed.

The dripping rate of the aforementioned mixture was controlled to 0.833 g per minute in terms of unslaked lime, the temperature in the carbonation reaction system to 41±1° C. and pH in the carbonation system to 8.8±0.1 for carbonation reaction to proceed under these conditions. Approximately 12 hours after the start thereof, that is, when the quantity of the methanol-unslaked lime mixture containing 600 g of unslaked lime had been dripped, the viscosity of the reaction mixture rose unduly to seriously interfere with the control of the reaction conditions such as the condition of stirring the reaction mixture, the passing through rate of carbon dioxide gas and the control of the pH, and the reaction had to be terminated halfway. The total quantity of water present in the carbonation reaction system at the time of termination of the reaction was 2.75 times mol equivalent with respect to the converted quantity of unslaked lime for the quantity of calcium carbonate and unslaked lime present in the carbonation reaction system.

The conditions for preparation of the calcium carbonate of Comparative Example 14 are shown in Table 10.

COMPARATIVE EXAMPLE 15

8 times mol equivalent of water with respect to quantity of unslaked lime was added to the dispersed methanol suspension of unslaked lime containing 20 weight % in terms of solid concentration of unslaked lime prepared in Reference Example 1 and a mixture of methanol - unslaked lime - water was prepared. Then, from this mixture 1,600 g of unslaked lime was taken out and it was dripped into the methanol - water suspension of the matrix spherical vaterite type calcium carbonate A prepared in Reference Example 2 with simultaneous start of letting carbon dioxide gas therethrough for carbonation reaction to proceed.

The dripping rate of the aforementioned mixture was controlled to 0.833 g per minute in terms of unslaked lime, the temperature in the carbonation reaction system to 41±1° C. and pH in the carbonation system to 8.8±0.1 for carbonation reaction to proceed under these conditions. Approximately 5.7 hours after the start thereof, that is, when the quantity of the methanol-unslaked lime mixture containing 286 g of unslaked lime had been dripped, the viscosity of the reaction mixture rose unduly to seriously interfere with the control of the reaction conditions such as the condition of stirring the reaction mixture, the passing through rate of carbon dioxide gas and the control of the pH, and the reaction had to be terminated halfway. The converted unslaked lime solid concentration for calcium carbonate and unslaked lime present in the carbonation reaction system at the time of termination of the reaction was 13 weight % on the weight of methanol present in the system.

The conditions for preparation of the calcium carbonate of Comparative Example 15 are shown in Table 10.

TABLE 1

| Example | 1 | 2 | 3 | 4 | 5 | 6 |
|---|---|---|---|---|---|---|
| Converted unslaked lime concentration | 3.0 | 3.8 | 1.0 | 3.0 | 3.0 | 3.8 |
| Water added | 11 | 8 | 15 | 11 | 11 | 8 |
| Temp. 1 | 42 | 37 | 50 | 42 | 42 | 47 |
| V1 | 0.082 | 0.026 | 0.082 | 0.082 | 0.082 | 0.082 |
| Temp. 2 | 45 | 40 | 55 | 45 | 45 | 50 |
| Yes/no of gelation | No | No | No | No | No | No |
| pH 1 | — | — | — | 10.0 | 9.2 | — |
| Time 1 | — | — | — | 13 | 15 | — |
| Time 2 | — | — | — | — | — | — |
| V2 | — | — | — | — | — | — |
| Time 3 | 19 | 40 | 15 | 20 | 20 | 25 |
| pH 2 | 7.0 | 7.0 | 7.0 | 10.0 | 9.2 | 6.7 |

Converted unslaked lime concentration: Converted unslaked lime concentration in dispersed methanol suspension before carbonation reaction (weight %).
Amount of water added: Amount of water added per mol of unslaked lime in dispersed methanol suspension before carbonation reaction (mol).
Temp. 1: Temperature in the reaction system at the start of carbonation reaction (°C.).
V1: Carbon dioxide gas feeding rate per mol of unslaked lime in dispersed methanol suspension before carbonation reaction (mol/min.)
Temp. 2: Temperature in the reaction system at point B (maximal point of conductivity within system) (°C.).
Gelation: Yes/no of abnormal viscosity increase/gelation in the course of carbonation reaction.
pH 1: pH in the reaction system at the time of interruption of feeding of carbon dioxide gas.
Time 1: Time elapsed from start of carbonation reaction to interruption of feeding of carbon dioxide gas (min.).
Time 2: Time elapsed from start of carbonation reaction to resumption of carbon dioxide gas feeding (min.).
V2: Carbon dioxide gas feeding rate at the time of resumption of carbon dioxide gas feeding, this feeding rate being per mol of unslaked lime present in dispersed methanol suspension before carbonation reaction. (mol/min.)
Time 3: Time elapsed from initial start of carbonation reaction to the time conductivity reaches point D (where it has reached 100μ S/cm) (min.).
pH 2: pH in the reaction system upon final stopping of carbon dioxide gas feeding.

TABLE 2

| Comp. Example | 1 | 2 | 3 | 4 |
|---|---|---|---|---|
| Converted unslaked lime concentration | 3.0 | 3.0 | 3.0 | 15 |
| Water added | 11 | 3 | 21 | 11 |
| Temp. 1 | 8 | 42 | 47 | 42 |
| V1 | 0.082 | 0.082 | 0.082 | 0.02 |
| Temp. 2 | 15 | 45 | 50 | 45 |
| Yes/no of gelation | Yes | Yes | No | Yes |
| pH 1 | — | — | — | — |
| Time 1 | — | — | — | — |
| Time 2 | — | — | — | — |
| V2 | — | — | — | — |
| Time 3 | — | 30 | 20 | 60 |
| pH 2 | — | 6.8 | 6.8 | 6.8 |

TABLE 3

| Example | 1 | 2 | 3 | 4 | 5 | 6 |
|---|---|---|---|---|---|---|
| DS1 | 0.28 | 0.70 | 1.40 | 0.28 | 0.32 | 0.77 |
| DS2 | 0.17 | 0.42 | 0.84 | 0.28 | 0.22 | 0.43 |
| DP1 | 0.250 | 0.498 | 0.99 | 0.366 | 0.298 | 0.610 |
| DP2 | 0.194 | 0.479 | 0.954 | 0.281 | 0.280 | 0.538 |
| DP3 | 0.177 | 0.447 | 0.893 | 0.258 | 0.251 | 0.463 |
| DP4 | 0.160 | 0.415 | 0.803 | 0.230 | 0.222 | 0.402 |
| DP5 | 0.147 | 0.356 | 0.760 | 0.214 | 0.205 | 0.332 |
| DS1/DS2 | 1.65 | 1.67 | 1.67 | 1.00 | 1.45 | 1.79 |
| DP3/DS1 | 0.63 | 0.64 | 0.64 | 0.92 | 0.78 | 0.60 |
| DP2/DP4 | 1.21 | 1.15 | 1.19 | 1.22 | 0.126 | 1.34 |
| DP1/DP5 | 1.70 | 1.40 | 1.30 | 1.71 | 1.45 | 1.84 |
| (DP2-DP4)/DP3 | 0.19 | 0.14 | 0.17 | 0.20 | 0.23 | 0.29 |

TABLE 4

| Comp. Example | 2 | 3 | 4 | 5 |
|---|---|---|---|---|
| DS1 | 0.038 | 1.70 | 0.62 | 0.29 |
| DS2 | 0.027 | 0.27 | 0.36 | 0.21 |
| DP1 | 1.813 | 2.483 | 2.565 | 0.480 |
| DP2 | 1.015 | 1.210 | 1.751 | 0.395 |
| DP3 | 0.432 | 0.657 | 0.945 | 0.314 |
| DP4 | 0.185 | 0.409 | 0.523 | 0.244 |
| DP5 | 0.104 | 0.246 | 0.363 | 0.204 |
| DS1/DS2 | 1.41 | 6.30 | 1.72 | 1.38 |
| DP3/DS1 | 11.37 | 0.39 | 1.52 | 1.08 |
| DP2/DP4 | 5.49 | 2.96 | 3.35 | 1.62 |
| DP1/DP5 | 17.43 | 10.09 | 7.07 | 2.35 |
| (DP2-DP4)/DP3 | 1.92 | 1.22 | 1.30 | 0.48 |

TABLE 5

| Example | 7 | 8 | 9 | 10 | 11 |
|---|---|---|---|---|---|
| Converted unslaked lime concentration | 3.8 | 3.0 | 3.0 | 3.8 | 3.0 |
| Water added | 11 | 11 | 8 | 11 | 8 |
| Temp. 1 | 42 | 42 | 42 | 42 | 42 |
| V1 | 0.0033 | 0.0022 | 0.0017 | 0.0033 | 0.0033 |
| Temp. 2 | 45 | 45 | 45 | 45 | 45 |
| Yes/no of gelation | No | No | No | No | No |
| pH 1 | — | — | — | 11.0 | — |
| Time 1 | — | — | — | 145 | — |
| Time 2 | — | — | — | 385 | — |
| V2 | — | — | — | 0.0033 | — |
| Time 3 | 300 | 450 | 600 | 540 | 300 |
| pH 2 | 6.8 | 6.8 | 6.8 | 6.8 | 6.8 |

TABLE 6

| Comp. Example | 7 | 8 | 9 |
|---|---|---|---|
| Converted unslaked lime concentration | 3.8 | 3.8 | 3.0 |
| Water added | 1 | 21 | 11 |
| Temp. 1 | 42 | 47 | 42 |
| V1 | 0.0033 | 0.0033 | 0.00083 |
| Temp. 2 | 45 | 50 | 44 |
| Yes/no of gelation | Yes | No | No |
| pH 1 | — | — | — |
| Time 1 | — | — | — |
| Time 2 | — | — | — |
| V2 | — | — | — |
| Time 3 | 300 | 300 | 1200 |
| pH 2 | 6.8 | 6.8 | 6.8 |

TABLE 7

| Example | 7 | 8 | 9 | 10 | 11 |
|---|---|---|---|---|---|
| DS1 | 0.25 | 0.40 | 1.20 | 0.70 | 0.25 |
| DS2 | 0.05 | 0.06 | 0.15 | 0.10 | 0.10 |
| DP1 | 0.363 | 0.441 | 1.230 | 0.746 | 0.484 |
| DP2 | 0.292 | 0.335 | 0.939 | 0.567 | 0.354 |
| DP3 | 0.222 | 0.248 | 0.820 | 0.456 | 0.246 |
| DP4 | 0.178 | 0.194 | 0.527 | 0.380 | 0.183 |
| DP5 | 0.159 | 0.165 | 0.428 | 0.324 | 0.167 |
| DS1/DS2 | 5.00 | 6.67 | 8.00 | 7.00 | 2.5 |
| DP3/DS1 | 0.89 | 0.62 | 0.68 | 0.65 | 0.98 |
| DP2/DP4 | 1.64 | 1.73 | 1.78 | 1.49 | 1.93 |
| DP1/DP5 | 2.28 | 2.67 | 2.87 | 2.30 | 2.90 |

TABLE 7-continued

| Example | 7 | 8 | 9 | 10 | 11 |
|---|---|---|---|---|---|
| (DP2−DP4)/DP3 | 0.51 | 0.57 | 0.50 | 0.41 | 0.70 |

TABLE 8

| Comp. Example | 7 | 8 | 9 | 10 |
|---|---|---|---|---|
| DS1 | 0.03 | 2.5 | 0.50 | 1.0 |
| DS2 | 0.027 | 0.25 | 0.10 | 0.3 |
| DP1 | 1.473 | 2.189 | 0.627 | 7.474 |
| DP2 | 0.936 | 1.430 | 0.372 | 6.684 |
| DP3 | 0.516 | 0.995 | 0.286 | 3.801 |
| DP4 | 0.317 | 0.790 | 0.229 | 1.922 |
| DP5 | 0.238 | 0.540 | 0.211 | 1.450 |
| DS1/DS2 | 1.11 | 10.0 | 5.0 | 3.33 |
| DP3/DS1 | 17.2 | 0.40 | 0.57 | 3.80 |
| DP2/DP4 | 2.95 | 1.81 | 1.62 | 3.48 |
| DP1/DP5 | 6.19 | 4.05 | 2.97 | 5.15 |
| (DP2−DP4)/DP3 | 1.20 | 0.64 | 0.50 | 1.25 |

Carbonation condition 1: Amount of water present in carbonation reaction system to the converted unslaked lime value for quantity of calcium carbonate and unslaked lime or slaked lime present in carbonation reaction system (times mol).
Carbonation condition 2: Converted unslaked lime solid concentration of calcium carbonate and unslaked lime or slaked lime present in carbonation reaction system to the quantity of methanol present in carbonation system (weight %).
Carbonation condition 3: pH in the carbonation reaction system.
Carbonation condition 4: Temperature in the carbonation reaction system (°C.).

TABLE 9

| | Carbonation condition 1 | Carbonation condition 2 | Carbonation condition 3 | Carbonation condition 4 |
|---|---|---|---|---|
| Example 12 | 11 | 3 | 8.8 ± 0.1 | 41 ± 1 |
| Example 13 | 11 | 3 | 8.8 ± 0.1 | 41 ± 1 |
| Example 14 | 11 | 3 | 9.8 ± 0.1 | 41 ± 1 |
| Example 15 | 11 | 3 | 11 ± 0.1 | 41 ± 1 |
| Example 16 | 11 | 3 | 9.5 ± 0.1 | 41 ± 1 |
| Example 17 | 11 | 3 | 11.4~8.5 | 41 ± 1 |
| Example 18 | 11 | 3 | 8.8 ± 0.1 | 41 ± 1 |

TABLE 10

| | Carbonation condition 1 | Carbonation condition 2 | Carbonation condition 3 | Carbonation condition 4 |
|---|---|---|---|---|
| Comp. Example 11 | 11 | 3 | 11.7 ± 0.1 | 37 ± 1 |
| Comp. Example 12 | 11 | 3 | 8.8 ± 0.1 | 5 ± 1 |
| Comp. Example 13 | 11 | 3 | 8.8 ± 0.1 | 41 ± 1 |
| Comp. Example 14 | 2.75 | 3 | 8.8 ± 0.1 | 41 ± 1 |
| Comp. Example 15 | 8 | 13 | 8.8 ± 0.1 | 41 ± 1 |

(Note)
For Comparative Examples 12, 14 and 15 in which carbonation reaction had to be terminated halfway due to undue increase of viscosity inside the reaction system, the values given are what were recorded at the time of termination.

TABLE 11

| | Example 12 | Example 13 | Example 14 |
|---|---|---|---|
| DS1 | 0.35 | 0.56 | 0.42 |
| DS2 | 0.35 | 0.55 | 0.42 |
| DP1 | 0.401 | 0.595 | 0.496 |
| DP2 | 0.360 | 0.573 | 0.471 |
| DP3 | 0.325 | 0.536 | 0.408 |
| DP4 | 0.279 | 0.496 | 0.361 |
| DP5 | 0.230 | 0.438 | 0.302 |
| DS1/DS2 | 1.00 | 1.00 | 1.0 |
| DP3/DS1 | 0.93 | 0.96 | 0.97 |
| DP2/DP4 | 1.29 | 1.16 | 1.30 |
| DP1/DP5 | 1.74 | 1.36 | 1.64 |
| (DP2−DP4)/DP3 | 0.25 | 0.14 | 0.27 |

TABLE 12

| | Example 15 | Example 16 | Example 17 | Example 18 |
|---|---|---|---|---|
| DS1 | 0.33 | 0.29 | 0.35 | 0.55 |
| DS2 | 0.06 | 0.08 | 0.35 | 0.55 |
| DP1 | 0.391 | 0.375 | 0.423 | 0.684 |
| DP2 | 0.313 | 0.302 | 0.375 | 0.582 |
| DP3 | 0.235 | 0.230 | 0.340 | 0.538 |
| DP4 | 0.185 | 0.196 | 0.275 | 0.428 |
| DP5 | 0.162 | 0.177 | 0.218 | 0.312 |
| DS1/DS2 | 5.5 | 3.6 | 1.0 | 1.0 |
| DP3/DS1 | 0.71 | 0.79 | 0.97 | 0.98 |
| DP2/DP4 | 1.69 | 1.54 | 1.36 | 1.36 |
| DP1/DP5 | 2.41 | 2.12 | 1.94 | 2.19 |
| (DP2−DP4)/DP3 | 0.54 | 0.46 | 0.29 | 0.29 |

TABLE 13

| | Comp. Example 11 | Comp. Example 13 |
|---|---|---|
| DS1 | 0.25 | 0.40 |
| DS2 | 0.20 | 0.30 |
| DP1 | 0.958 | 2.087 |
| DP2 | 0.642 | 1.075 |
| DP3 | 0.483 | 0.512 |
| DP4 | 0.215 | 0.248 |
| DP5 | 0.159 | 0.189 |
| DS1/DS2 | 1.25 | 1.33 |
| DP3/DS1 | 1.93 | 1.28 |
| DP2/DP4 | 2.99 | 4.33 |
| DP1/DP5 | 6.03 | 11.04 |
| (DP2−DP4)/DP3 | 0.88 | 1.62 |

What is claimed is:

1. A composition comprising spherical, ellipsoidal or plate-shaped calcium carbonate satisfying the requirements of (a), (b), (c), (d), (e), (f) and (g) below;

(a) $0.1 \, \mu m \leq DS1 \leq 2.0 \, \mu m$
(b) $0.04 \, \mu m \leq DS2 \leq 2.0 \, \mu m$
(c) $1.0 \leq DS1 / DS2 \leq 20$
(d) $DP3 / DS1 \leq 1.25$
(e) $1.0 \leq DP2 / DP4 \leq 2.5$
(f) $1.0 \leq DP1 / DP5 \leq 4.0$
(g) $(DP2 - DP40) / DP3 \leq 1.0$ where:
DS1: Mean particle size (μm, major axis) of primary particles as determined by the aid of a scanning electron microscope;
DS2: Mean particle size (μm, minor axis) of primary particles as determined by the aid of a scanning electron microscope;
DP1: Mean particle size (μm) for a total of 10% by weight counted from larger particle size side on the basis of the particle size distribution determined by the aid of a light transmission particle size distribution tester;
DP2: Mean particle size (μm) for a total of 25% by weight counted from larger particle size side on the basis of the particle size distribution determined by the aid of a light transmission particle size distribution tester;
DP3: Mean particle size (μm) for a total of 50% by weight counted from larger particle size side on the basis of the particle size distribution determined by the aid of a light transmission particle size distribution tester;
DP4: Mean particle size (μm) for a total of 75% by weight counted from larger particle size side on the basis of a particle size distribution determined by the aid of the light transmission particle size distribution tester; and DP5: Mean particle size (μm) for a total of 90% by weight counted from larger particle size side on the basis of the particle size distribution determined by the aid of a light transmission particle size distribution tester.

2. The method for growing particles of vaterite calcium carbonate and controlling the shape thereof, wherein carbon dioxide gas is passed through a mixture of vaterite calcium carbonate, methanol, water and either unslaked lime or both unslaked and slaked lime meeting the conditions set forth below, pH of carbonation is controlled in a range of 5.6–11.5 and the temperature is controlled in the range of 15°–60° C.; wherein:

(a) the quantity of water is 3–30 times mol equivalent with respect to converted unslaked lime value for calcium carbonate and unslaked lime and/or slaked lime in the mixture;

(b) converted unslaked lime solid concentration of calcium carbonate, unslaked lime and/or slaked lime is 0.5–12 weight % with respect to the quantity of methanol in the mixture; and (c) the vaterite calcium carbonate is vaterite calcium carbonate satisfying the requirements set forth in claim 1.

3. The method according to claim 2, wherein carbonation is carried out while dripping, simultaneously with passage of carbon dioxide gas, a mixture of methanol, unslaked lime and/or slaked lime and water prepared by adding 3–30 times mol equivalent of water with respect to unslaked lime, or slaked lime equivalent thereto to a methanol suspension of unslaked lime and/or slaked lime whose converted unslaked lime concentration is 0.5–12 weight %, into a mixture of methanol, vaterite calcium carbonate and water prepared by adding 3–30 times mol equivalent of water with respect to unslaked lime to a methanol suspension of vaterite calcium carbonate whose converted unslaked lime concentration is 0.5–12 weight %.

4. The method according to claim 2 or 3, wherein carbonation is carried out with the pH in the carbonation reaction system being controlled in a range of 5.8–10.0

5. The method according to claim 2 or 3, wherein carbonation is carried out wherein the temperature of carbonation is in a range of 33°–55° C.

* * * * *